US008520006B2

(12) United States Patent
Matsunaga

(10) Patent No.: US 8,520,006 B2
(45) Date of Patent: Aug. 27, 2013

(54) IMAGE PROCESSING APPARATUS AND METHOD, AND PROGRAM

(75) Inventor: Daisuke Matsunaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1548 days.

(21) Appl. No.: 11/866,793

(22) Filed: Oct. 3, 2007

(65) Prior Publication Data

US 2008/0100624 A1    May 1, 2008

(30) Foreign Application Priority Data

Oct. 25, 2006  (JP) ................................. 2006-290264

(51) Int. Cl.
*G06T 11/00*    (2006.01)
(52) U.S. Cl.
USPC ............................ 345/469; 345/467; 345/471
(58) Field of Classification Search
USPC ......... 345/467, 469, 471; 715/269; 709/219; 382/203
See application file for complete search history.

(56) References Cited

U.S. PATENT DOCUMENTS

| | | | |
|---|---|---|---|
| 5,562,350 A * | 10/1996 | Sakurai .......................... | 345/471 |
| 5,579,416 A * | 11/1996 | Shibuya et al. ............... | 345/467 |
| 5,600,770 A * | 2/1997 | Kawabata et al. ............ | 715/269 |
| 6,310,624 B1* | 10/2001 | Watanabe ...................... | 345/467 |
| 2002/0010725 A1* | 1/2002 | Mo ............... | 707/530 |
| 2004/0006749 A1* | 1/2004 | Fux et al. ...................... | 715/535 |
| 2005/0146528 A1* | 7/2005 | Kotiranta ...................... | 345/467 |
| 2006/0259590 A1* | 11/2006 | Tsai et al. ...................... | 709/219 |
| 2011/0129157 A1* | 6/2011 | Xu et al. ....................... | 382/203 |

FOREIGN PATENT DOCUMENTS

| | | | |
|---|---|---|---|
| JP | A 05-012402 | | 1/1993 |
| JP | A 06-095647 | | 4/1994 |
| JP | 2005157448 A | * | 6/2005 |
| JP | A 2005-157448 | | 6/2005 |

* cited by examiner

*Primary Examiner* — Chante Harrison
(74) *Attorney, Agent, or Firm* — Fitzpatrick, Cella, Harper & Scinto

(57) ABSTRACT

It is determined whether the size of an outline vector to be output is equal to or smaller than a predetermined size. If it is determined that the size of the outline vector to be output is equal to or smaller than the predetermined size, image data is generated by using outline font data corresponding to the outline vector. If it is determined that the size of the outline vector to be output is larger than the predetermined size, image data is generated by using the outline vector.

18 Claims, 23 Drawing Sheets

FIG. 6

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

ATTRIBUTE  1 : text  2 : picture  3 : table  4 : line  5 : photo

INPUT FILE INFORMATION

| TOTAL NUMBER OF BLOCKS | N(=6) |
|---|---|

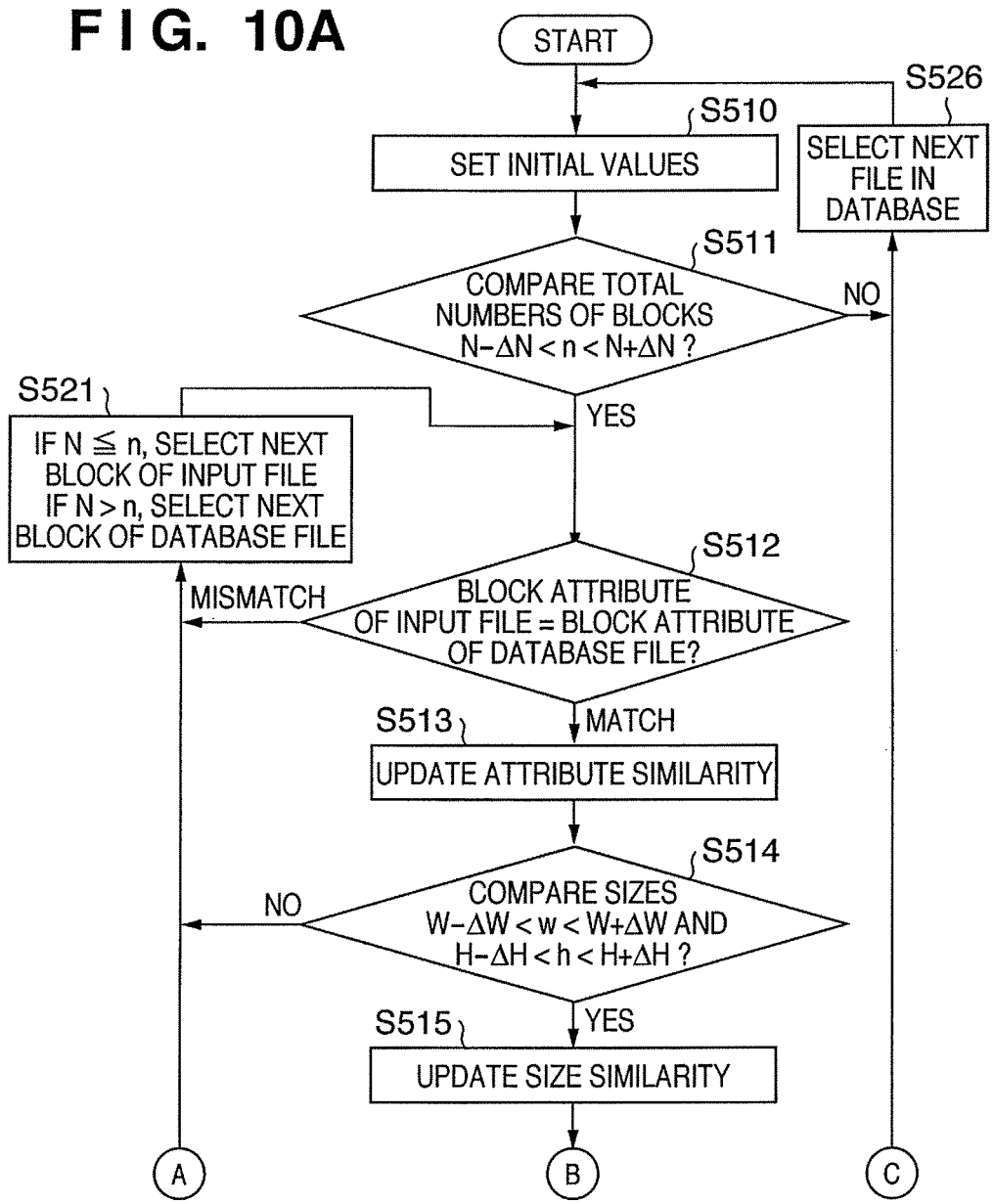
F I G. 10A

F I G. 11
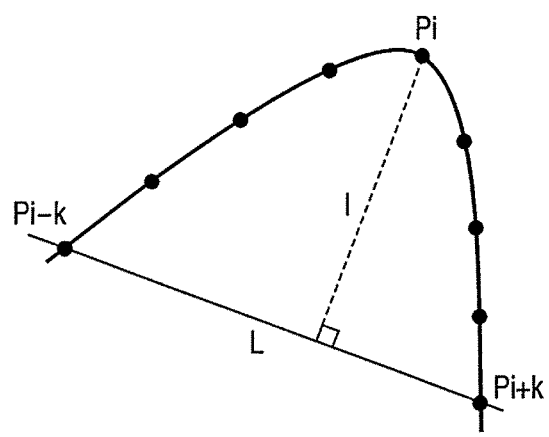

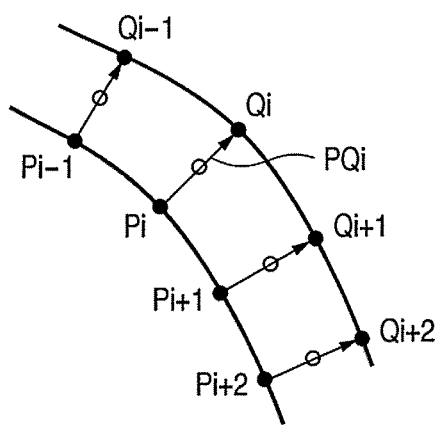
F I G. 12

IMAGE PROCESSING APPARATUS AND METHOD, AND PROGRAM

BACKGROUND OF THE INVENTION

1. Field of the Invention

The present invention relates to an image processing apparatus for processing input image data, and a control method and program thereof.

2. Description of the Related Art

Along with a recent growing interest in environmental issues, movement toward paperless offices is rapidly progressing. For this purpose, a document management system is formed, which causes a scanner to read paper documents accumulated and stored in, for example, binders, converts the read images into a portable document format (to be abbreviated as "PDF" hereinafter), and accumulates and stores them in an image storage device (database).

There is also known a system which recognizes character information contained in image data obtained by reading a document and associating the information with font data (e.g., Japanese Patent Laid-Open No. 5-12402). This facilitates reuse/reediting of paper documents.

In Japanese Patent Laid-Open No. 5-12402, character information contained in image data obtained by reading is associated with font data. For this reason, the information is not completely faithful to the character information described in the document. Japanese Patent Laid-Open No. 2005-157448 describes a method of solving this problem. That is, character information contained in image data is converted into outline data by using vector data. The outline vector is managed in association with the character type of the character information.

Japanese Patent Laid-Open No. 2005-157448 also describes a method of converting outline data formed from character information by using vector data into a format processible by predetermined document creation application software.

Thus generated electronic data has character information faithful to the original input document image. It is also possible to scale the data by using the vector data and output it.

As a known technique, information called hint information is added to a font with a predetermined format. When characters are made very small by reducing the character size to a predetermined size or less, the hint information allows correction of character information and reduction of the line width of the characters to prevent damage to the readability due to overlapping of character lines (Japanese Patent Laid-Open No. 6-95647).

However, the method described in Japanese Patent Laid-Open No. 2005-157448 does not handle character information as a font. Instead, character information is handled as vector data so the hint information of a font is not used. For this reason, if created electronic data is output after reducing the character portion to a very small size in, for example, reduction layout printing such as 6-in-1 or 8-in-1, stroke connection may occur in the character portion, and the readability may be poor.

SUMMARY OF THE INVENTION

The present invention has been made to solve the above-described problems, and has as its object to provide an image processing apparatus capable of reducing a character portion in electronic data to a very small size and printing it while maintaining the readability of the character portion, and a control method and program thereof.

According to first aspect of the preset invention, an image processing apparatus comprises:

determination means for determining whether a size of an outline vector to be output is not more than a predetermined size; and generation means for generating image data by using outline font data corresponding to the outline vector when the determination means determines that the size of the outline vector to be output is not more than the predetermined size, and generating image data by using the outline vector when the determination means determines that the size of the outline vector to be output is more than the predetermined size.

In a preferred embodiment, the apparatus further comprises:

replacement means for replacing the outline vector with information to read out the outline font data corresponding to the outline vector when the determination means determines that the size of the outline vector to be output is not more than the predetermined size; and reading means for reading out the outline font data on the basis of the information to read out the outline font data, which is replaced by the replacement means.

In a preferred embodiment, the apparatus further comprises replacement means for replacing the outline vector with the outline font data corresponding to the outline vector when the determination means determines that the size of the outline vector to be output is not more than the predetermined size.

In a preferred embodiment, the outline font data contains information to increase readability of a character smaller than the predetermined size.

According to the second aspect of the present invention, an image processing method, comprises:

a determining step of determining whether a size of an outline vector to be output is not more than a predetermined size; and a generating step of generating image data by using outline font data corresponding to the outline vector when it is determined in the determining step that the size of the outline vector to be output is not more than the predetermined size, and generating image data by using the outline vector when it is determined in the determining step that the size of the outline vector to be output is more than the predetermined size.

According to the third aspect of the present invention, a program stored in a computer-readable medium, causes a computer to execute:

a determining step of determining whether a size of an outline vector to be output is not more than a predetermined size; and a generating step of generating image data by using outline font data corresponding to the outline vector when it is determined in the determining step that the size of the outline vector to be output is not more than the predetermined size, and generating image data by using the outline vector when it is determined in the determining step that the size of the outline vector to be output is more than the predetermined size.

Further features of the present invention will become apparent from the following description of exemplary embodiments with reference to the attached drawings.

BRIEF DESCRIPTION OF THE DRAWINGS

FIG. 6 is a table showing an example of block information of respective blocks obtained by the block selection process;

FIGS. 10A and 10B are flowcharts for explaining a procedure of searching a database for the layout of an electronic file similar to an input image file;

FIG. 11 is a view for explaining a point with a maximum curvature;

FIG. 12 is a view for explaining an example wherein an outer outline which is close to an inner outline or another outer outline is expressed as a line with a given width;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
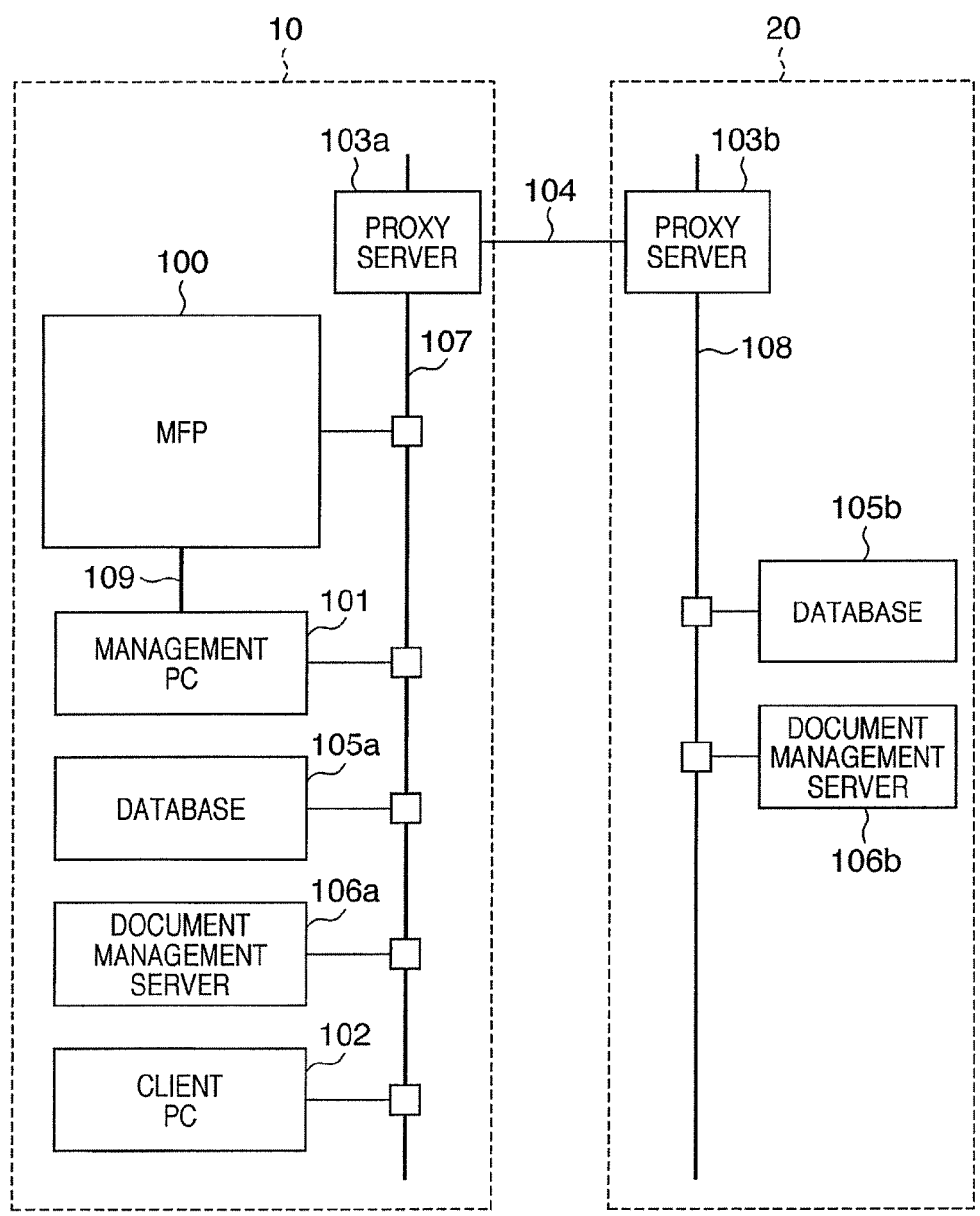
FIG. 1 is a block diagram showing the arrangement of an image processing system according to the first embodiment of the present invention.

FIG. 1 is a block diagram showing the arrangement of an image processing system according to the first embodiment of the present invention. An image processing system shown in FIG. 1 is implemented in an environment wherein offices 10 and 20 are connected via a network 104 such as the Internet.

An MFP 100, a management PC 101 that controls the MFP 100, a client PC 102, a document management server 106a, a database 105a, and a proxy server 103a are connected to a LAN 107 formed in the office 10. A document management server 106b, database 105b, and proxy server 103b are connected to a LAN 108 formed in the office 20.

The client PC 102 includes an external storage unit, search image input unit, and search result output unit. The LAN 107 and the LAN 108 in the office 20 are connected to the network 104 such as the Internet via the proxy servers 103a and 103b, respectively. "MFP" is short for "Multi Function Peripheral" which indicates a multifunction peripheral that implements a plurality of kinds of functions (e.g., copy function, print function, and transmission function).

In this embodiment, the MFP 100 functioning as an image processing apparatus executes an image reading process of optically reading a paper document and converting the read image into an image signal and part of image processing for the image signal. The image signal is input to the management PC 101 via a LAN 109. Even a normal PC can implement the management PC 101 which incorporates an image storage unit, image processing unit, display unit, and input unit. The management PC 101 may partially or wholly be integrated with the MFP 100.

Figure 2:
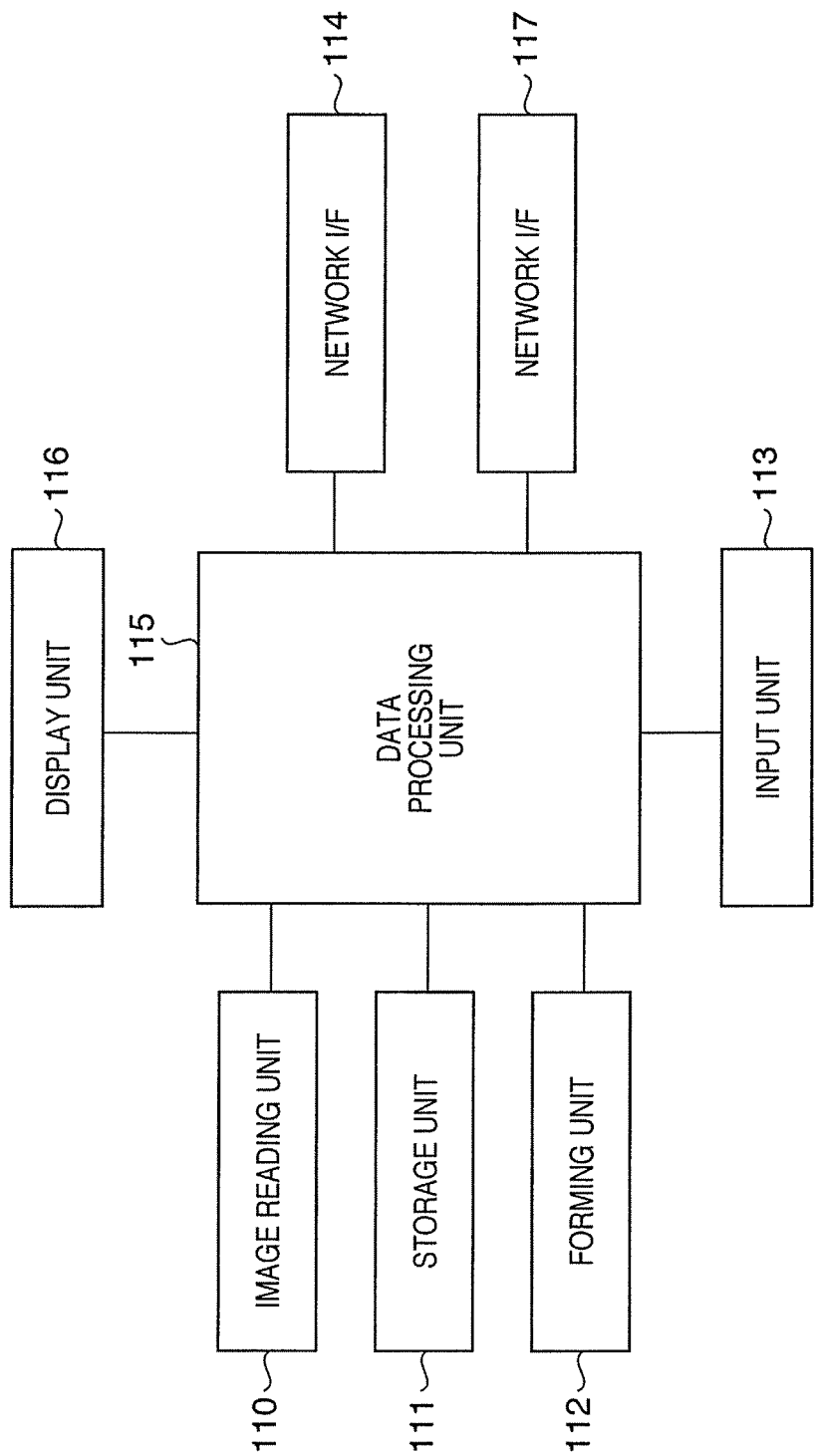
FIG. 2 is a block diagram showing the arrangement of an MFP 100 according to the first embodiment of the present invention.

FIG. 2 is a block diagram showing the arrangement of the MFP 100 according to the first embodiment of the present invention. Referring to FIG. 2, an image reading unit 110 including an auto document feeder (to be abbreviated as an "ADF" hereinafter) irradiates one document page or each of a bundle of document pages with an internal light source and forms a document reflection image on a solid-state image sensing element through a lens. The image reading unit 110 obtains, from the solid-state image sensing element, an image reading signal in the raster order as image information having a resolution of, for example, 600 dpi. In a normal copying function, a data processing unit 115 processes the image signal into a print signal. In a multi-copy mode, a storage unit 111 temporarily holds print data of one page. The image data are sequentially output to a forming unit 112, thereby forming images on paper sheets.

Print data output from the client PC 102 is input to the MFP 100 via the LAN 107. The data is input to the data processing unit 115 via a network I/F 114 and converted into printable raster data. Then, the data is output to the forming unit 112 and printed on a paper sheet.

An operator's instruction to the MFP 100 is input via an input unit 113 such as keys provided on the MFP 100 or an input unit including the keyboard and mouse of the management PC 101. A control unit in the data processing unit 115 controls the series of operations.

A display unit 116 of the MFP 100 or a display unit such as the monitor of the management PC 101 or client PC 102 displays an operation input state or image data that is being processed. The storage unit 111 is also controlled from the management PC 101. Data exchange and control between the MFP 100 and the management PC 101 are done by using a network I/F 117 and the directly connected LAN 109.

[Outline of Process]

Figure 3:
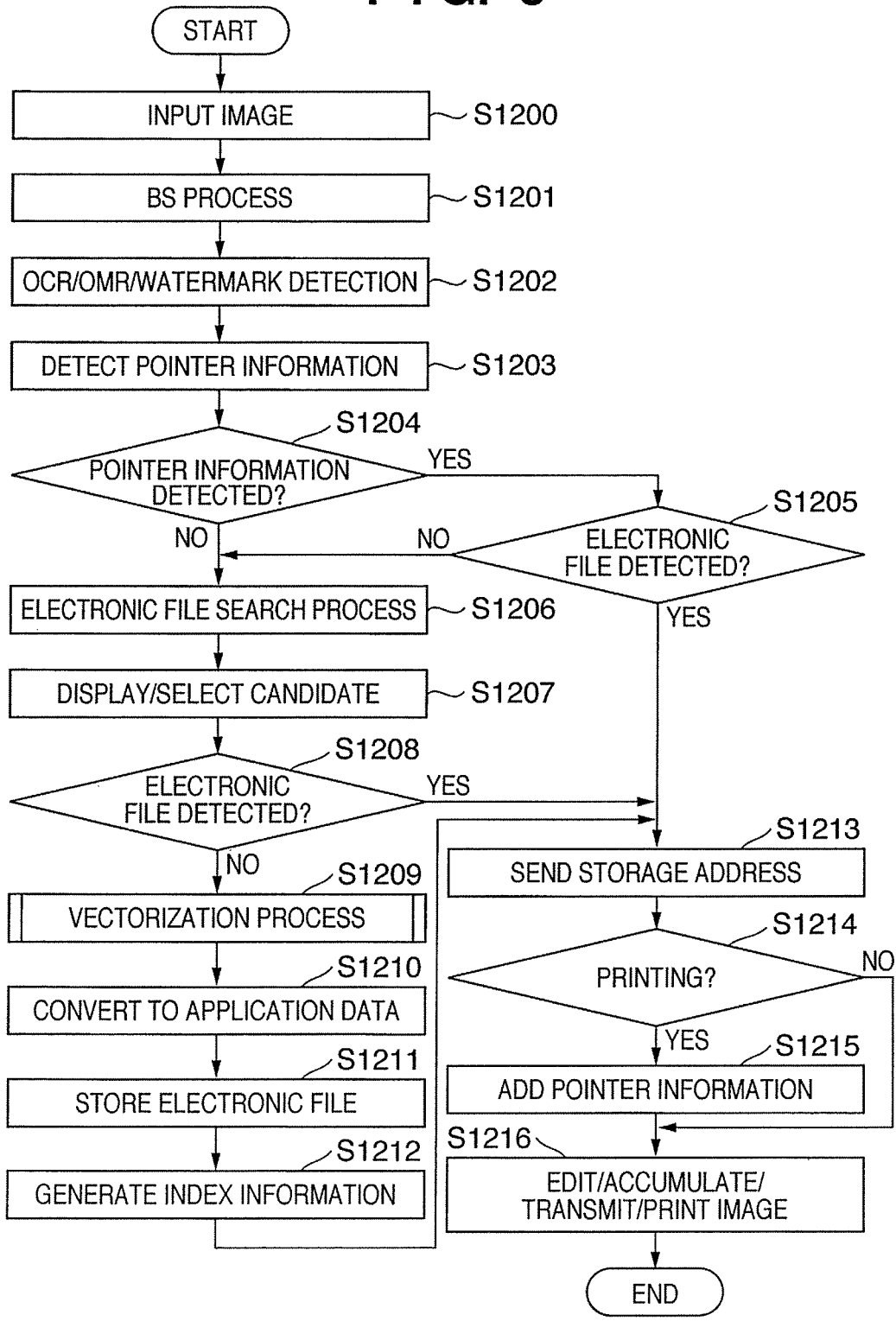
FIG. 3 is a flowchart for explaining the procedure of image processing by the image processing system according to the first embodiment of the present invention.

An outline of the whole image processing by the image processing system according to the first embodiment of the present invention will be described next. FIG. 3 is a flowchart for explaining the procedure of image processing by the image processing system according to the first embodiment of the present invention.

First, the image reading unit 110 of the MFP 100 operates and raster-scans one document page, thereby obtaining an 8-bit image signal with a resolution of, for example, 600 dpi (image input process: step S1200). The data processing unit 115 preprocesses the image signal. The storage unit 111 stores it as image data of one page.

The CPU of the management PC 101 separates regions corresponding to text/line portions and halftone image portions from the image signal stored in the storage unit 111. The CPU further segments the character portions into blocks each corresponding to a paragraph or tables and graphics formed from lines. The image portions expressed by halftone are segmented into so-called objects which independently correspond to separated rectangular blocks of images or background parts (BS (Block Selection) process: step S1201).

At this time, an object corresponding to a two-dimensional barcode or URL recorded in the document image as additional information is detected. A URL undergoes character recognition by an OCR process (optical character recognition process). In this way, the two-dimensional barcode or object is interpreted (step S1202).

Pointer information is detected from the storage unit 111 that stores the original electronic file of the document image (step S1203). Pointer information may be added by using a directly invisible digital watermark that embeds information between characters or in a halftone image. When additional information is embedded as a digital watermark, the watermark information is detected and interpreted in step S1202.

It is determined whether pointer information is detected (step S1204). If pointer information is detected (YES in step S1204), an electronic file corresponding to the document image is searched for on the basis of an address indicated by the pointer information (step S1205). The electronic file is stored in, for example, the hard disk of the client PC 102 in FIG. 1. Alternatively, the electronic file is stored in one of the databases 105*a* and 105*b* of the document management servers 106*a* and 106*b* connected to the LANs 107 and 108 in the offices 10 and 20 or the storage unit 111 provided in the MFP 100 itself. The storage unit 111 is searched for to detect the electronic file on the basis of the pointer information obtained in step S1203.

If no electronic file is detected (NO in step S1205), the process advances to step S1206. If the detected electronic file is an image file represented by PDF or tiff (i.e., if existing document creation software cannot reuse or reedit the image file), the process advances to step S1206. If pointer information itself does not exist in step S1204 (NO in step S1204), the process advances to step S1206.

In step S1206, an electronic file search process is executed. First, a word is extracted from the OCR result of each text block obtained in step S1202, and full text search is executed. Alternatively, so-called layout search is executed on the basis of the array and attributes of objects. If a similar electronic file is detected by search, the thumbnail is displayed as a search result (step S1207). If a plurality of electronic files are detected by search, and the operator needs to select one of them, he/she specifies an electronic file by an input operation. If there is only one candidate electronic file, the process automatically branches from step S1208 to step S1213 to notify the operator of the storage address that indicates the storage location of the electronic file.

If no electronic file is detected in step S1208 (NO in step S1208), or the detected electronic file is an image file represented by PDF or tiff, the process branches to step S1209 to execute vectorization.

Figure 4:
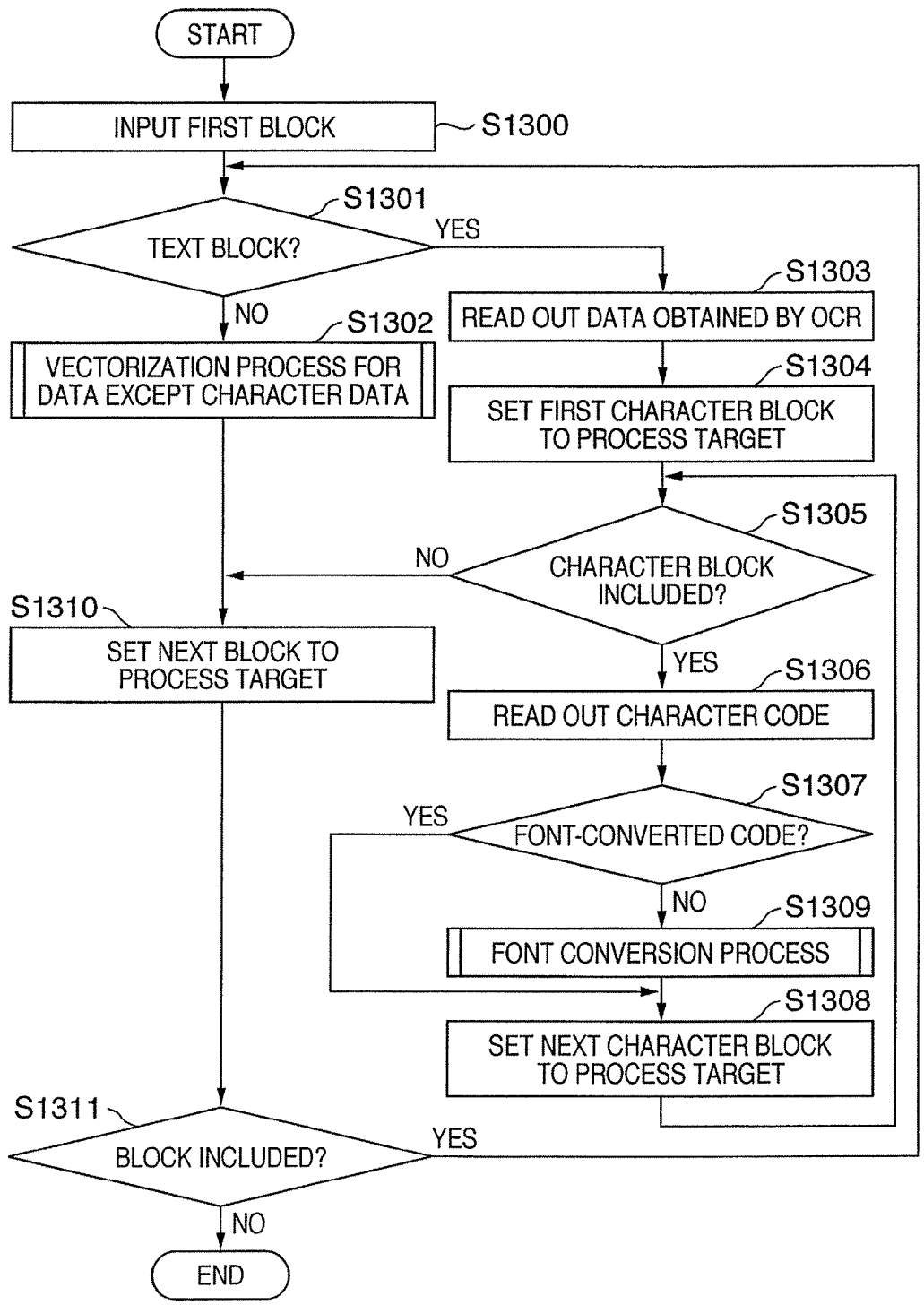
FIG. 4 is a flowchart for explaining details of a vectorization process in image processing by the image processing system according to the first embodiment of the present invention.

In step S1209, the raster data (raster image data) is converted into vector data (vector image data) to obtain a small and easily editable electronic file that is close to the original electronic file. This process will be described in detail with reference to FIG. 4. FIG. 4 is a flowchart for explaining details of the vectorization process which is executed by the image processing system to convert the character information of the input image into outline data by using vector data.

Of the blocks segmented in step S1201, a block located at the top (the upper left origin of the image) is input (step S1300). It is determined whether the input block is a text block (step S1301) If it is determined that the block is not a text block (NO in step S1301), the process advances to step S1302.

If it is determined that the block is a text block (YES in step S1301), the OCR data of the block that is already processed in step S1202 is wholly read out (step S1303). A character block located at the top (upper left origin) of the text block is set to the process target (step S1304).

It is determined whether the text block includes a character block (step S1305). If no character block exists (No step S1305), the process advances to step S1310. If a character block exists (YES in step S1305), a character code corresponding to the character block is read out (step S1306).

It is determined on the basis of the readout result whether the character code of the character block is already converted (step S1307). If it is determined that the character code is already converted (YES in step S1307), the next character block is set to the process target (step S1308). The process from step S1305 is executed for the next character block. It is determined here whether character codes are identical, and the character color or size may be different.

If it is determined in step S1307 that the character code is not converted yet (NO in step S1307), that is, the character code has not appeared in the past, a font conversion process is executed to recognize/convert the font and register the font data (step S1309). The next character block is set to the process target (step S1308). The process from step S1305 is executed for the next character block.

If it is determined in step S1305 that no character block exists anymore (NO step S1305), that is, all character blocks in the text block have undergone the above-described process, the next block is set to the process target (step S1310). It is determined whether the next process target block exists (step S1311).

If a block exists (YES in step S1311), it is determined again whether the block is a text block (step S1301). If the block is not a text block (NO in step S1301), a predetermined vectorization process for data except character data is executed (step S1302). Then, the next block is set to the process target (step S1310). If it is determined in step S1301 that the block is a text block (YES in step S1301), the above-described process is executed.

If no block exists in step S1311 (NO in step S1311), the process of all blocks finishes, and the vectorization process finishes. The above-described process makes it possible to minimize font recognition/conversion that is necessary for each character block and has a heavy process load and efficiently executes the vectorization process. More specifically, font conversion and recognition with a heavy load need not be executed for every character, and a great increase in process speed can be expected. Vector data obtained by the vectorization process is stored in the storage unit 111 in association with information including a character code, character color, and character size.

After the vectorization process in step S1209 described with reference to FIG. 4 is done for each block, the image processing system according to the first embodiment executes the following process. That is, the system converts the data into application data with a format such as rtf by using the layout information of the document (step S1210). The storage unit 111 stores the converted file as an electronic file (step S1211).

For a vectorized document image, index information for search is generated and added to a search index file so as to enable direct search of the electronic file in a similar process later (step S1212). The operator is notified of the storage address that indicates the storage location of the electronic file (step S1213).

It is determined whether the operator is going to execute a printing process (step S1214). If he/she wants to print (YES in step S1214), the process advances to step S1215 to execute a pointer information addition process of adding pointer information to the file as image data.

If an electronic file is detected in step S1208 (YES in step S1208), the process advances to step S1213 to directly specify the electronic file. The operator is notified of the storage address that indicates the storage location of the electronic file. If the operator wants to print (YES in step S1214), the pointer information is added to the electronic file (step S1215). Even when the electronic file is specified from pointer information in step S1205, or the electronic file is obtained by the search process (YES in step S1208), the operator is notified of the storage address of the electronic file (step S1213).

A process such as image editing, accumulation, transmission, or printing can be done by using the electronic file obtained by the above-described process (step S1216).

The above-described process enables a process such as reuse or reediting, unlike a system using image data. Additionally, since the information amount decreases, the accumulation efficiency rises, and the transmission time shortens. This is very advantageous because high-quality image data can be printed or displayed.

Each process block will be described below in detail.

The block selection (BS) process in step S1201 will be described first.

[Block Selection Process]

Figure 5:
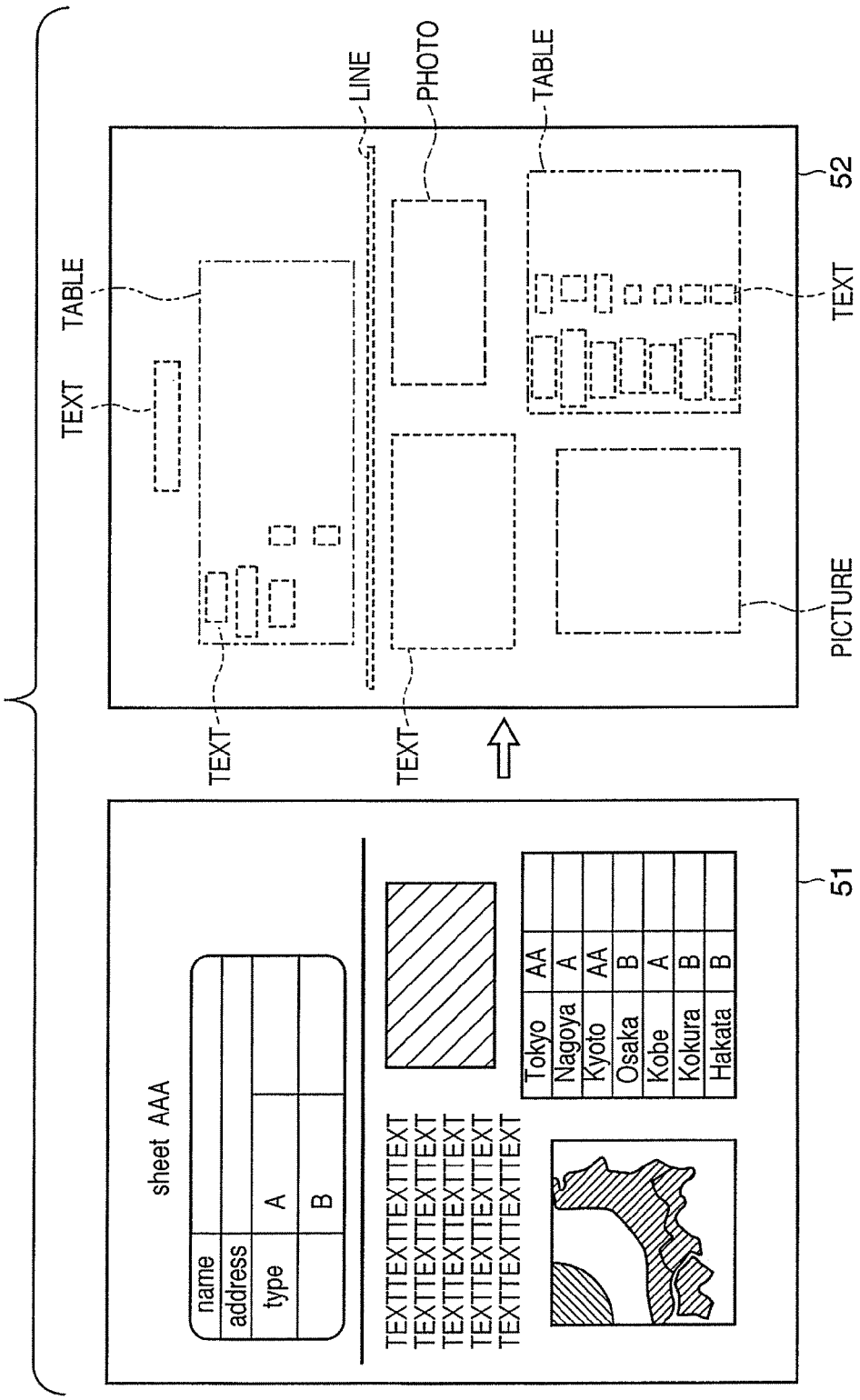
FIG. 5 is a view showing a state wherein read image data of one page is segmented into a plurality of blocks by a block selection process by determining the attributes.

FIG. 5 is a view showing a state wherein read image data of one page is segmented into a plurality of blocks by the block selection process by determining the attributes. In the block selection process, image data 51 of one page read in step S1200 is recognized as clusters (blocks) 52 of objects. The attributes of the respective blocks are determined as TEXT, PHOTO, LINE, TABLE, and the like, thereby segmenting the image data into regions (blocks) having different attributes.

An embodiment of the block selection process will be described below.

An input image is binarized to monochrome image data. Outline tracing is executed to extract a pixel cluster surrounded by a black pixel outline. For a black pixel cluster having a large area, outline tracing is executed for white pixels in the cluster, thereby extracting a white pixel cluster. A black pixel cluster is also extracted recursively from a white pixel cluster having a predetermined area or more. The above-described process is executed for a document having, for example, black characters printed on a white background. A document of another type can be processed in the same way by setting the color corresponding to the background to "white" and that corresponding to an object to "black".

Thus obtained black pixel clusters are classified into regions with different attributes on the basis of the sizes and shapes. For example, a pixel cluster having an aspect ratio of almost 1 and a size in a predetermined range is determined as a pixel cluster corresponding to a character. A portion where neighboring characters regularly line up and form a group is determined as a character region. A flat pixel cluster is categorized as a line region. An area occupied by a black pixel cluster including rectangular white pixel clusters which regularly line up and have a predetermined size or more is categorized as a table region. A region where pixel clusters with indeterminate forms are scattered is categorized as a photo region. A cluster with an arbitrary shape is categorized as a graphic region.

FIG. 6 is a table (block information table) showing an example of block information of the respective blocks obtained by the block selection process. The information of every block shown in FIG. 6 is used for vectorization or search to be described later.

[Detection of Pointer Information from Image Data]

The OCR/OMR process in step S1202 which is executed to extract the storage location of the electronic file from the read image data will be described.

<<Character Recognition>>

For the character recognition process, in the first embodiment, an image extracted in correspondence with each character is recognized by using a pattern matching method, thereby obtaining a corresponding character code. In this recognition process, a feature obtained from a character image is converted into a several-ten-dimensional numerical value string to generate an observation feature vector. The observation feature vector is compared with a dictionary feature vector that is obtained in advance for every character type. A character type with a shortest distance is output as a recognition result. Various kinds of known methods are available for extracting a feature vector. For example, a character is segmented into meshes. Character lines in each mesh are counted as line elements in the respective directions, thereby obtaining a (mesh count)—dimensional vector as a feature.

When character recognition is to be executed for a character region extracted by the block selection process (step S1201), the writing direction (horizontal or vertical direction) of the region is determined first. Lines are extracted in the corresponding direction. Then, character images are obtained by extracting characters. In determining the writing direction (horizontal or vertical direction), horizontal and vertical projections of pixel values in the region are calculated. If the variance of the horizontal projections is larger than that of the vertical projections, the region is determined as a horizontal writing region. Otherwise, the region is determined as a vertical writing region.

Decomposition into character strings and characters is done in the following way. In horizontal writing, lines are extracted by using the horizontal projections. In addition, characters are extracted on the basis of the vertical projection of each extracted line. In a vertical writing character region, the terms "horizontal" and "vertical" in the above explanation are exchanged. The character size can be detected on the basis of the extracted size.

<<Barcode Reading>>

Figure 7:
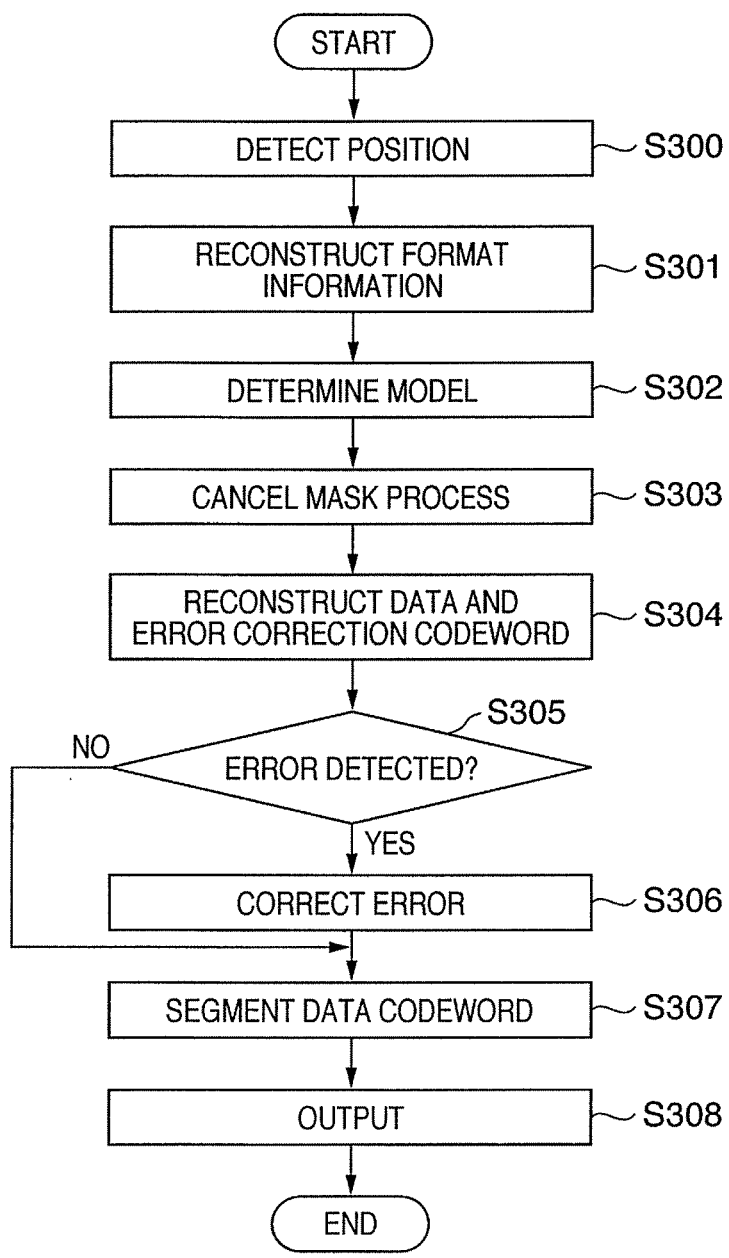
FIG. 7 is a flowchart for explaining a procedure of outputting a data character string by decoding a two-dimensional barcode (QR code symbol) added to a document image.

FIG. 7 is a flowchart for explaining a procedure of outputting a data character string by decoding a two-dimensional barcode (QR code symbol) added to a document image. FIG.

8 is a view showing an example of a document 310 with an added two-dimensional barcode.

First, the internal CPU scans image data obtained by reading the document 310 and stored in the page memory of the data processing unit 115. The CPU detects the position of a predetermined two-dimensional barcode symbol 311 from the result of the above-described block selection process. The QR code position detection pattern includes identical position detection element patterns 311a to 311c arranged at three of the four corners of the symbol (step S300).

Format information adjacent to the position detection pattern is reconstructed, and an error correction level and mask pattern applied to the symbol are acquired (step S301). The model of the symbol is determined (step S302). The mask process is canceled by XOR-operating a coded region bit pattern by using the mask pattern obtained from the format information (step S303).

The symbol character is read in accordance with an arrangement rule corresponding to the model, and message data and an error correction codeword are reconstructed (step S304). Next, an error on the reconstructed code is detected (step S305). If an error is detected (YES in step S305), the error is corrected (step S306). The data codeword is segmented on the basis of a mode indicator and a character count indicator based on the error-corrected data (step S307). Finally, the data characters are decoded on the basis of the specification mode, and the result is output (step S308). If no error is detected in step S305 (NO in step S305), the process advances to step S307.

The data embedded in the two-dimensional barcode is server address information (pointer information) that indicates the location of the corresponding electronic file. The pointer information includes path information containing, e.g., an IP address representing the file server and server address and a corresponding URL.

In the first embodiment, the document 310 having pointer information which is added by using a two-dimensional barcode has been exemplified. However, the present invention is not limited to this. For example, if pointer information is directly printed as a character string, the block of the character string complying with a predetermined rule is detected by the above-described block selection process. The respective characters contained in the character string representing pointer information are recognized. This allows directly obtaining the address information of the server that stores the original electronic file.

Figure 8:
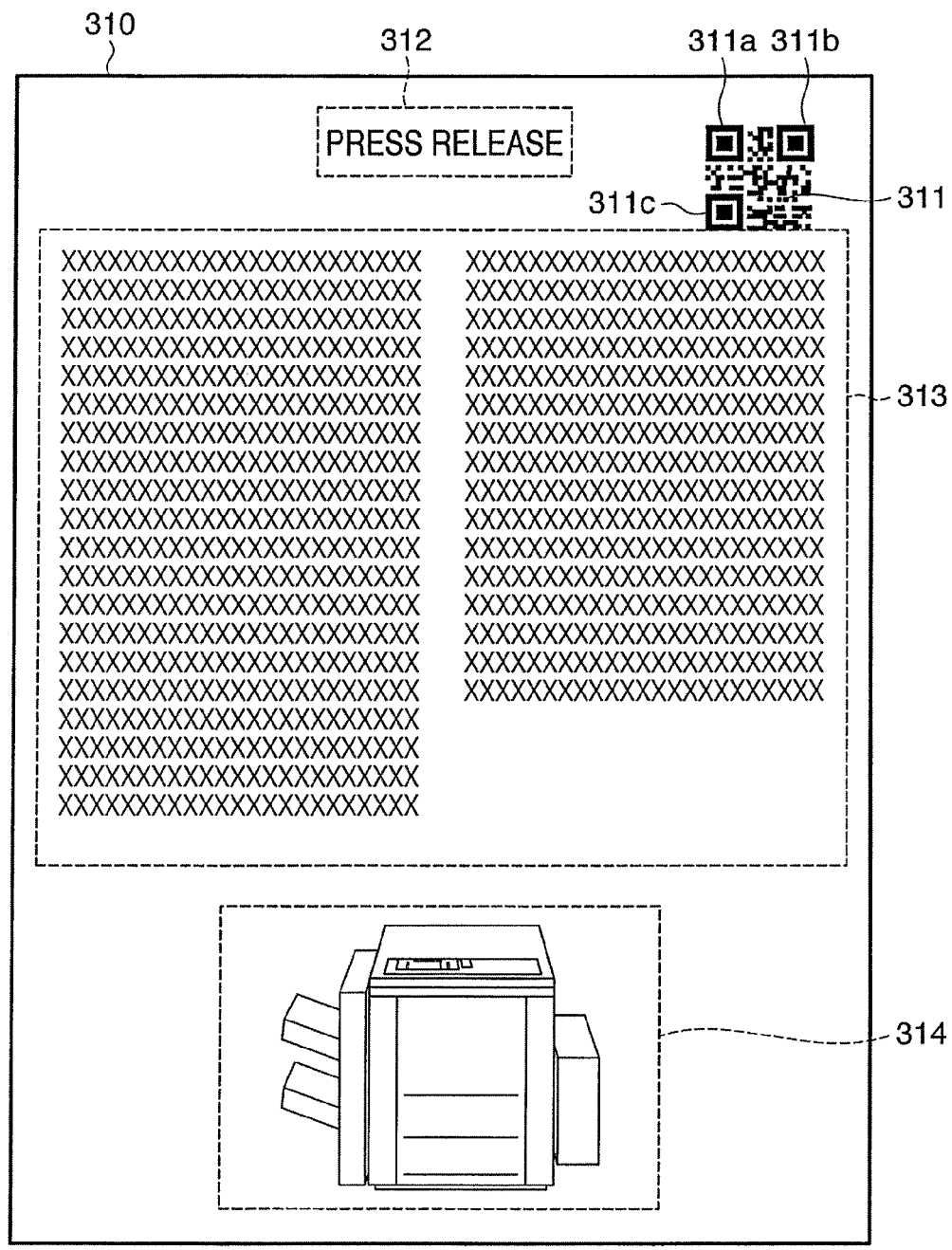
FIG. 8 is a view showing an example of a document 310 with an added two-dimensional barcode.

It is also possible to add pointer information by invisibly modulating the interval between adjacent characters of the character string of a text block 312 or 313 of the document 310 shown in FIG. 8 and embedding watermark information using the character interval. When the character interval is detected in the character recognition process (to be described later), pointer information can be obtained from the watermark information. Alternatively, pointer information may be added to a natural image block 314 as a digital watermark.

[File Search Using Pointer Information]

Figure 9:
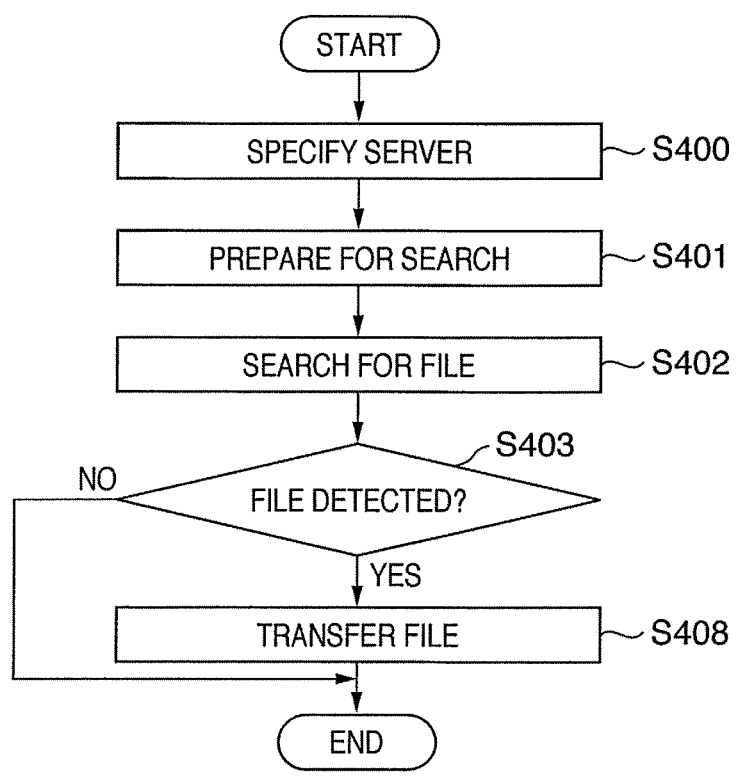
FIG. 9 is a flowchart for explaining a process procedure of searching, on the basis of detected pointer information, for a server that stores an electronic file.

A process from step S1203 described with reference to FIG. 3, that is, a process of searching for a server that stores the electronic file on the basis of pointer information will be described next in detail. FIG. 9 is a flowchart for explaining a process procedure of searching, on the basis of detected pointer information, for a server that stores the electronic file.

On the basis of the server address contained in the pointer information, a file server that stores the electronic file is specified (step S400). A file server indicates the client PC 102, document management servers 106a and 106b incorporating the databases 105a and 105b, and the MFP 100 itself that incorporates the storage unit 111. An address is path information including a URL and a server name.

After the file server is specified, a request is sent to the server (file server) indicated by the pointer information in step S1207 described with reference to FIG. 3 to prepare for searching in it (step S401). The file server searches for the corresponding electronic file in accordance with the file search process in step S1208 (step S402). The file server determines whether the electronic file exists (step S403).

If the electronic file does not exist (NO in step S403), the file server notifies the MFP 100 of it and finishes the process. If the electronic file exists (YES in step S403), the file server displays the candidates to execute the process in steps S1209 to S1213, as described above with reference to FIG. 3. The file server notifies the operator of the storage address of the electronic file and transfers the electronic file to the transfer destination (i.e., MFP 100) (step S408).

[Server Search Process Using Pointer Information Containing File Access Right]

The file search process in step S1206 in FIG. 3 will be described next in detail with reference to FIGS. 6 and 10. The process in step S1206 is executed when the input document (input file) has no pointer information in step S1204, no electronic file is detected regardless of the existence of pointer information, or the electronic file is an image file, as described above.

Assume that the input file and the blocks extracted by the OCR/OMR process in step S1202 have the pieces of information (block information and input file information) shown in FIG. 6. In the first embodiment, attributes, coordinate positions, widths, heights, and the presence/absence of OCR information are used as information contents, as shown in FIG. 6.

Attributes are classified into "text", "line", "photo", "picture", and "table". In FIG. 6, the blocks are defined as block 1, block 2, block 3, block 4, block 5, and block 6 in ascending order of coordinates X (e.g., X1<X2<X3<X4<X5<X6) for the descriptive convenience. The total number of blocks indicates the total number of blocks in the input file. In the example shown in FIG. 6, the total number of blocks is 6.

Figure 10B:
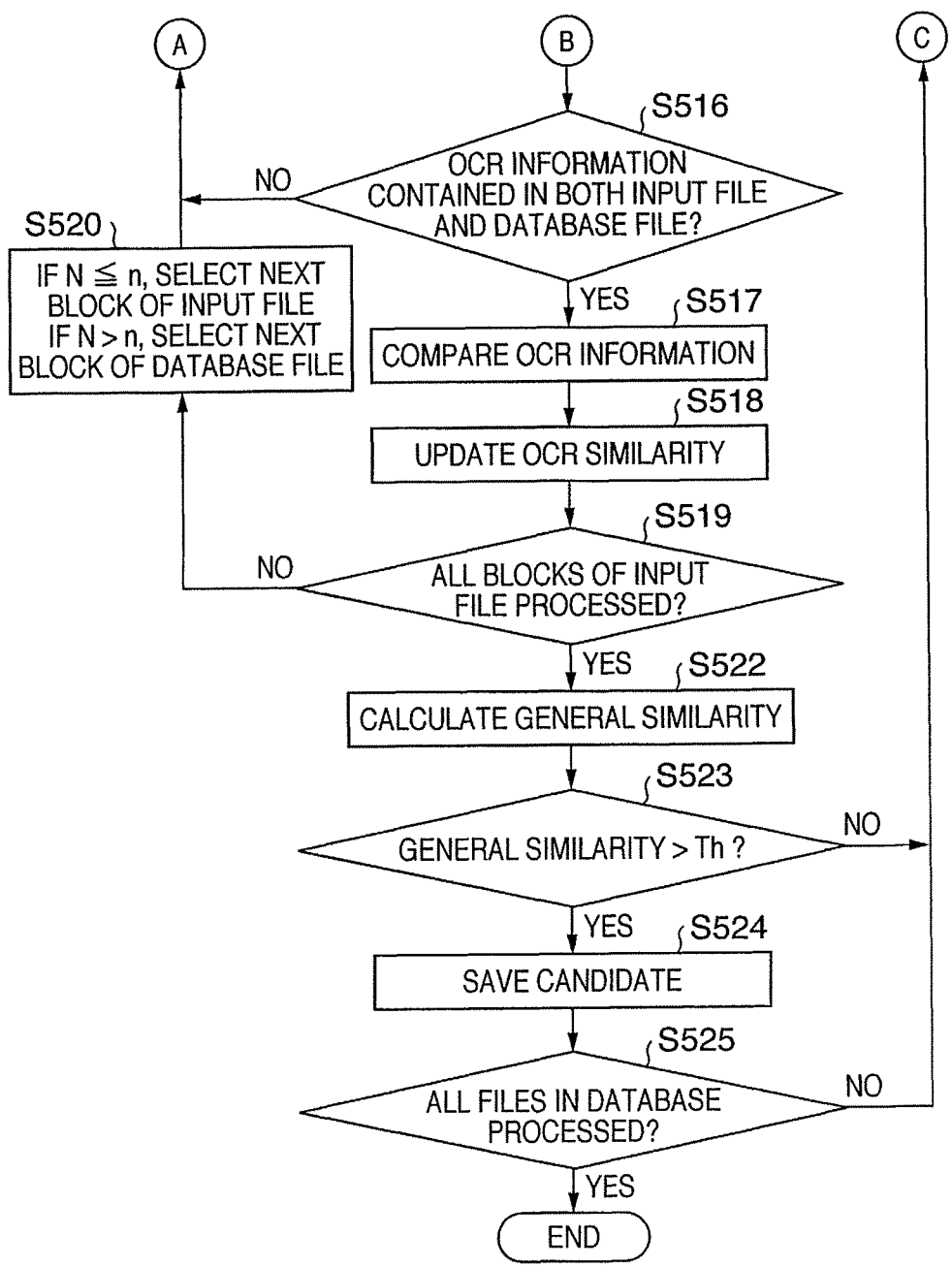

A procedure of searching a database for the layout of an electronic file similar to the input image file by using these pieces of information will be described below. FIGS. 10A and 10B are flowcharts for explaining a procedure of searching a database for the layout of an electronic file similar to the input image file. Every electronic file in the database is also assumed to have the same information as in FIG. 6. According to the flow of the flowcharts in FIGS. 10A and 10B, the electronic file read from the input document is sequentially compared with each electronic file in the database.

First, similarities (to be described later) and the like are initialized to set initial values (step S510). The total numbers of blocks are compared (step S511). If true (YES in step S511), the pieces of information of blocks in the files are sequentially compared (step S512).

More specifically, it is determined in step S511 whether the number n of blocks of a file in the database falls within the range of an error $\Delta N$ of the number N of blocks of the input file. If the number n of blocks falls within the error range, it is true (YES in step S511). Otherwise, it is false (NO in step S511). In step S512, the block attributes of the input file are compared with those of the database file. If they match, the process advances to a comparison process from step S513. If they do not match, the process advances to step S521.

In block information comparison, the attribute similarity, size similarity, and OCR similarity are calculated in steps S513, S515, and S518, respectively. In step S522, the general similarity is calculated on the basis of the calculated similarities. The similarities can be calculated by using a known technique, and a description thereof will be omitted.

In step S523, it is determined whether the general similarity is more than a preset threshold value Th. If the general similarity is equal to or less than the threshold value Th (NO in step S523), the process returns to step S526. If the general similarity is more than the threshold value Th (YES in step S523), the electronic file is stored as a similar candidate (step S524).

In FIG. 10A, N, W, and H indicate the total number of blocks of the input file, the width of each block, and the height of each block, respectively, and ΔN, ΔW, and ΔH indicate errors based on the block information of the input file. Additionally, n, w, and h indicate the total number of blocks of the database file, the width of each block, and the height of each block, respectively. In size comparison in step S514, the pieces of position information (X,Y) may be compared.

A database file which has a general similarity more than the threshold value Th and is stored as a candidate as a result of search is displayed as, for example, a thumbnail image (step S1207). If it is necessary to select one of a plurality of files, the operator specifies a file by an input operation.

[Font Recognition/Conversion and Vectorization Process for Data Except Character Data]

The procedure of the vectorization process in step S1209 in FIG. 3 has already been described with reference to FIG. 4. The font conversion process (step S1309) and the vectorization process for data except character data (step S1302) in FIG. 4 will be described in detail.

<<Font Recognition>>

A plurality of dictionary feature vectors equal in number to the character types used in character recognition are prepared in correspondence with the character shape types, that is, font types. A font type is output together with a character code in matching, thereby recognizing the font of a character.

<<Font Conversion>>

The information (character information) of a character portion is converted into vector data by using outline data prepared in advance and the character codes and font information (character type information) obtained by the above-described character recognition process. If the input document image is a color image, the color of each character is extracted from the color image and recorded together with vector data.

This process enables to convert image information belonging to a character block into vector data having an almost faithful shape, size, and color.

<<Vectorization Process for Data Except Character Data>>

A region determined as a picture, line, or table region in the block selection process in step S1201 is set as a target. The outline of each extracted pixel cluster is converted into vector data. More specifically, the dot sequence of pixels included in an outline is divided at points regarded as corners, and each section is approximated by a partial line or curve. "Corner" indicates a point where the curvature is maximum.

FIG. 11 is a view for explaining a point with a maximum curvature. As shown in FIG. 11, a chord is drawn between points Pi−k and Pi+k spaced k points apart from an arbitrary point Pi to the left and right sides. A point with a maximum curvature is obtained as a point having a maximum distance between the chord and the point Pi. Let R be the chord length/arc length between Pi−k and Pi+k. A point where the value R is equal to or smaller than a threshold value can be regarded as a corner. In each section divided at corners, a line can be vectorized by using the least squares method for the dot sequence, and a curve can be vectorized by using a ternary spline function.

When the target has an inner outline, it is similarly approximated by a partial line or curve by using the dot sequence of a white pixel outline extracted by the block selection process.

As described above, it is possible to vectorize the outline of a graphic having an arbitrary shape by partial line approximation of outlines. If the input document image is a color image, the color of each graphic is extracted from the color image and recorded together with vector data.

FIG. 12 is a view for explaining an example wherein an outer outline which is close to an inner outline or another outer outline is expressed as a line with a given width. When an outer outline is close to an inner outline or another outer outline in a given section, as shown in FIG. 12, the two outlines can be combined and expressed as a line with a given width.

More specifically, lines are drawn from points Pi on a given outline to points Qi on another outline such that each pair of points have the shortest distance. When distances PQi maintain a predetermined value or less on average, the section of interest is approximated by a line or curve which is expressed by a dot sequence including middle points PQi. The average value of the distances PQi is defined as the width of the line or curve. A line or a table ruled line including a set of lines can efficiently be expressed by vector data as a set of lines having a given width, as described above.

In vectorization using the character recognition process for a character block, a character whose distance from the dictionary is shortest is used as a character recognition result, as described above. If the distance is equal to or more than a predetermined value, the recognition result does not always match the original character and often indicates a wrong character having a similar shape.

In the present invention, such a character is handled like a general line and converted into outline data, as described above. That is, even a character that is conventionally erroneously recognized in the character recognition process can be vectorized into outline data that is visibly faithful to image data without vectorization to a wrong character. In the present invention, a block determined as a photo region remains image data without vectorization.

<<Graphic Recognition>>

After the outline of a graphic having an arbitrary shape is vectorized in the above-described way, the vectorized partial lines are grouped in correspondence with every graphic object. This process will be described below.

Figure 13:
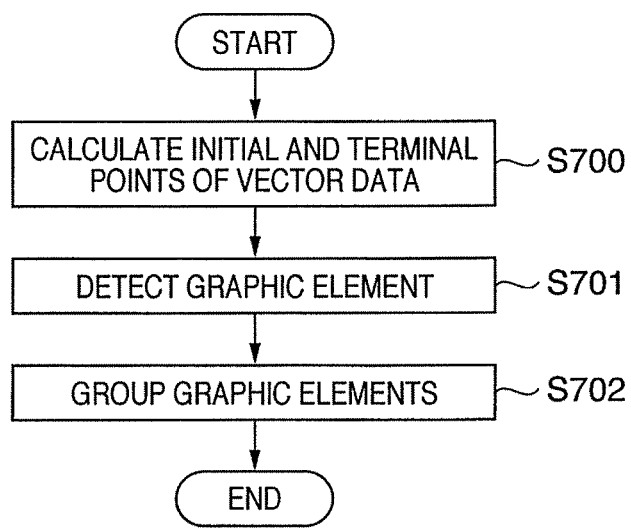
FIG. 13 is a flowchart for explaining a process procedure of grouping vector data in correspondence with every graphic object.

FIG. 13 is a flowchart for explaining a process procedure of grouping vector data in correspondence with every graphic object. First, initial and terminal points of each vector data are calculated (step S700). Using the initial and terminal point information of each vector, a graphic element is detected (step S701). Graphic element detection indicates detecting a closed graphic formed by partial lines. A graphic is detected on the basis of a principle that each vector forming a closed shape has vectors coupled to its two ends.

Next, other graphic elements or partial lines present in the graphic element are grouped and defined as one graphic object (step S702). If any other graphic elements or partial lines do not exist in the graphic element, the graphic element is defined as a graphic object.

Figure 14:
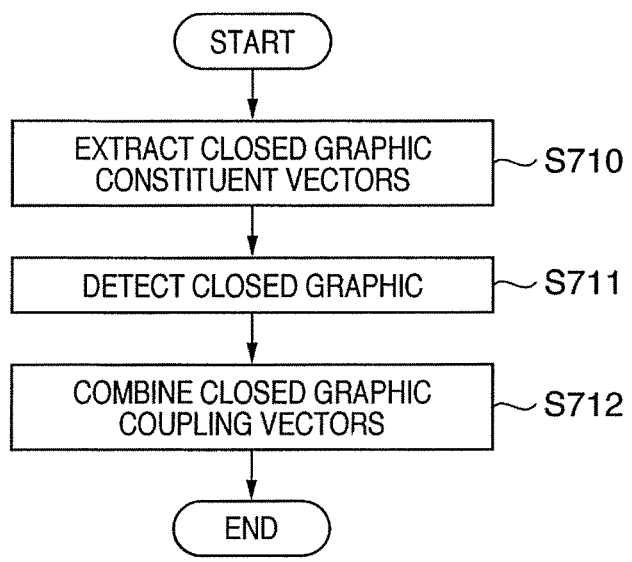
FIG. 14 is a flowchart for explaining a process procedure of detecting a graphic element.

FIG. 14 is a flowchart for explaining a process procedure of detecting a graphic element. Unwanted vectors each having two ends unconnected to other vectors are removed from vector data, thereby extracting closed graphic constituent vectors (step S710). A starting point is set at the initial point of one of the closed graphic constituent vectors, and the vectors are sequentially traced clockwise. The vectors are traced until returning to the starting point. All the passed vectors are grouped as a closed graphic which forms one graphic element (step S711).

All closed graphic constituent vectors existing in the closed graphic are also grouped. Another starting point is set at the initial point of a vector which is not put into a group yet. The same process as described above is repeated. Finally, vectors which are connected to those grouped as a closed graphic in step S711 are detected from the unwanted vectors removed in step S710 and grouped as one graphic element (step S712).

This process allows handling a graphic block as an independent graphic object that is independently reusable.

[Conversion Process to Application Data]

Figure 15:
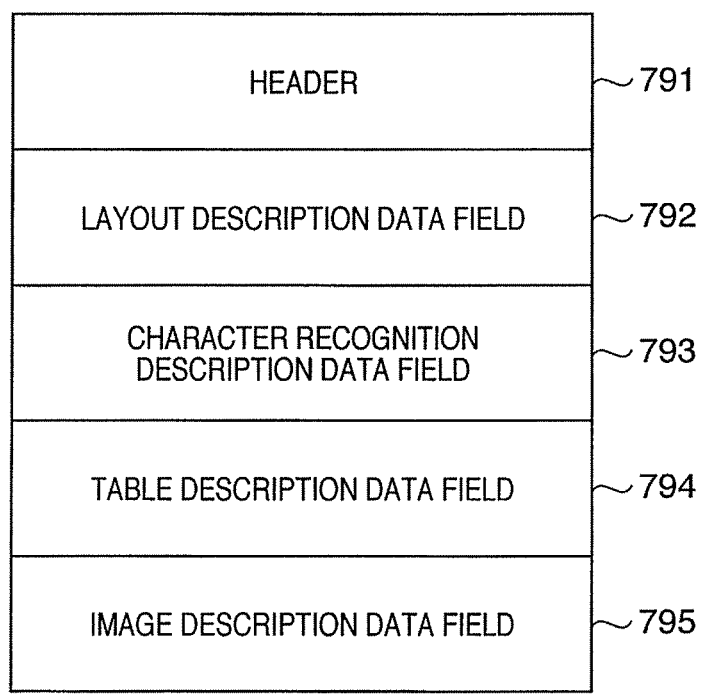
FIG. 15 is a view showing the data structure of a file having an intermediate data format obtained by converting image data of one page by the block selection process and vectorization process.

FIG. 15 is a view showing the data structure of a file having an intermediate data format obtained by converting image data of one page by the block selection process (step S1201) and vectorization process (step S1209). The data format shown in FIG. 15 is called a document analysis output format (DAOF). That is, FIG. 15 shows the DAOF data structure.

Referring to FIG. 15, a header 791 holds information about document image data as a process target. A layout description data field 792 holds the attribute information and address information of the respective blocks which are recognized in correspondence with the attributes in the document image data. Examples of the attributes are TEXT (text), TITLE (title), CAPTION (caption), LINEART (line), PICTURE (natural image), FRAME (frame), and TABLE (table).

A character recognition description data field 793 holds a character recognition result (character codes) obtained by character-recognizing text blocks such as TEXT, TITLE, and CAPTION blocks. A table description data field 794 stores details of the structure of TABLE blocks. An image description data field 795 extracts the image data of PICTURE and LINEART blocks from the document image data and stores them.

Such DAOF data is not always saved as intermediate data and is sometimes saved as a file by itself. In the file state, however, a general document creation application cannot reuse individual objects. An application data conversion process of converting DAOF data into application data (step S1210) will be described next in detail.

Figure 16:
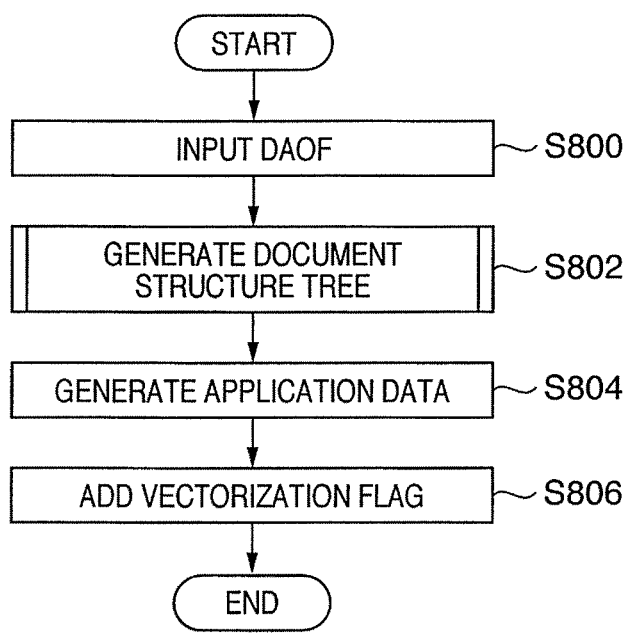
FIG. 16 is a flowchart for explaining a schematic procedure of the overall application data conversion process.

FIG. 16 is a flowchart for explaining a schematic procedure of the overall application data conversion process. First, DAOF data is input (step S800). A document structure tree serving as a base of application data is generated (step S802). Actual data in the DAOF are input on the basis of the generated document structure tree to generate actual application data (step S804).

Figure 17:
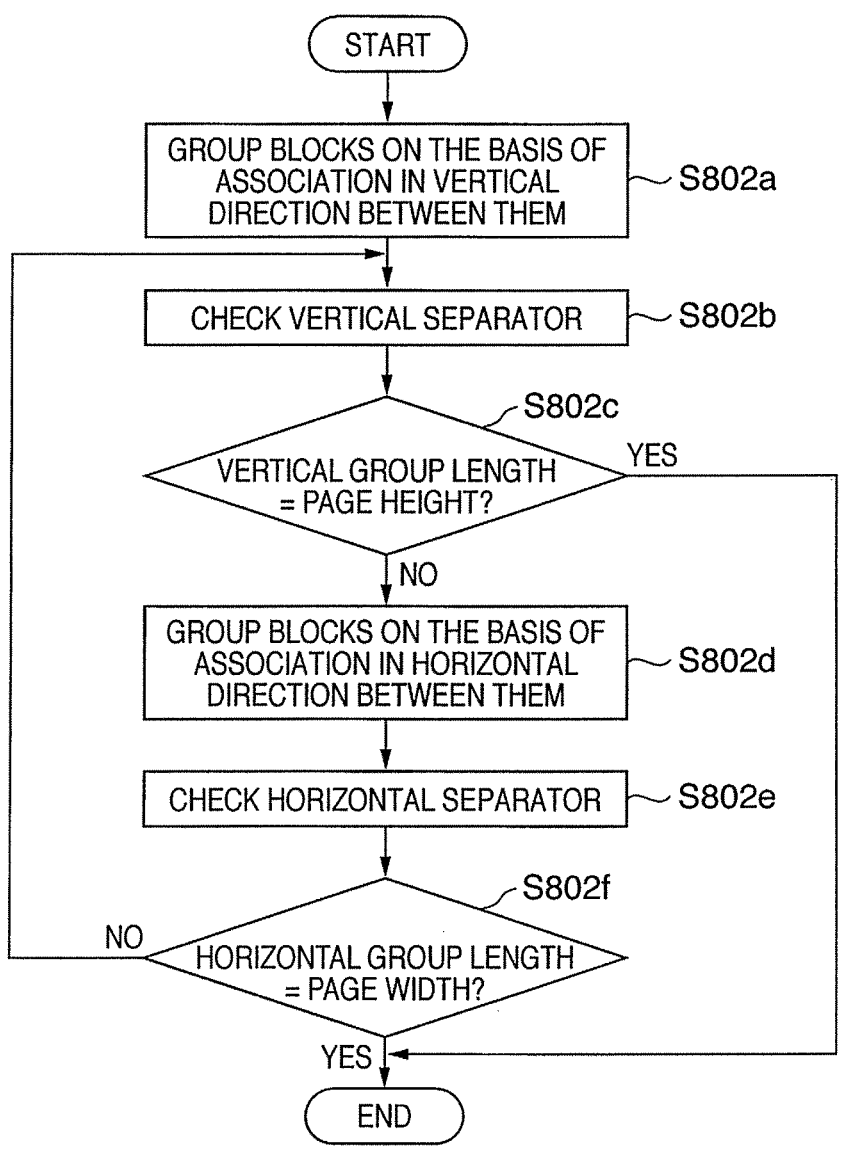
FIG. 17 is a flowchart for explaining a detailed process procedure of a document structure tree generation process.
Figure 18A:
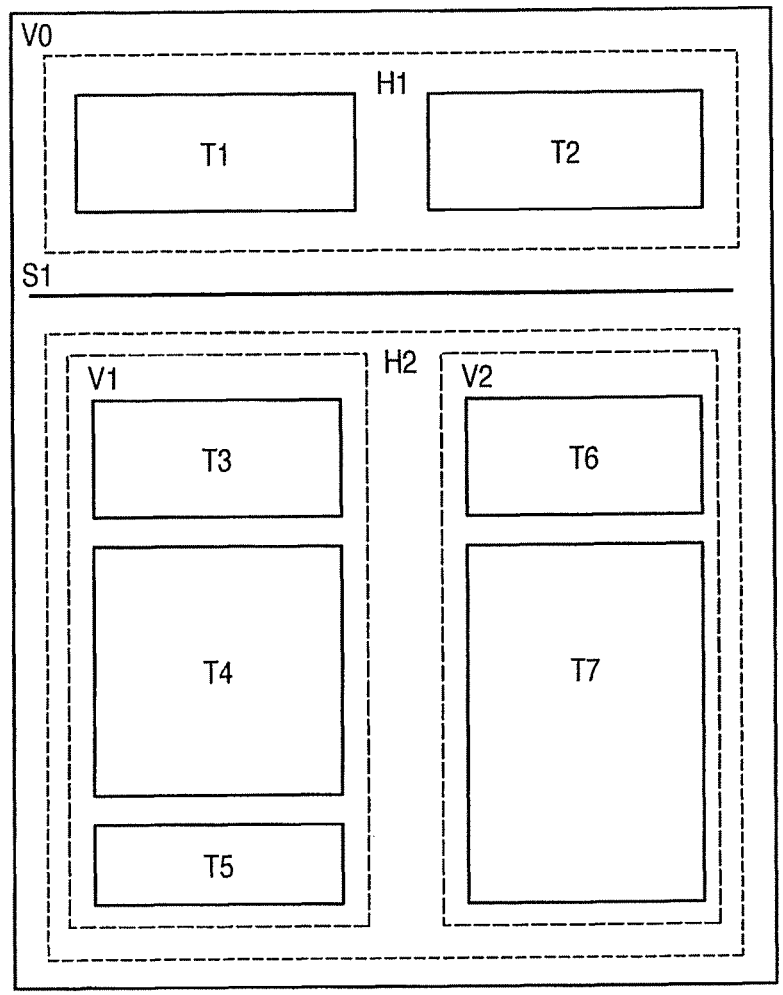
FIGS. 18A and 18B are views for explaining the outline of a document structure tree.
Figure 18B:
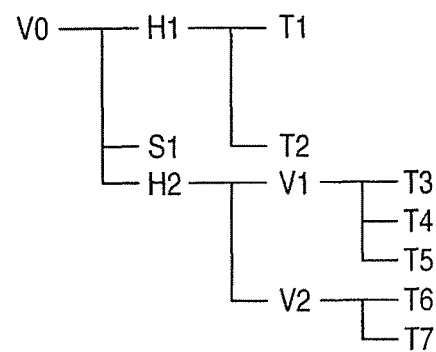

FIG. 17 is a flowchart for explaining a detailed process procedure of the document structure tree generation process (step S802). FIGS. 18A and 18B are views for explaining the outline of the document structure tree. As the fundamental rule of whole control, the flow of processes transits from a microblock (single block) to a macroblock (aggregate of blocks). In the following description, a block indicates a microblock or an entire macroblock.

The blocks are regrouped on the basis of association in the vertical direction (step S802a). Immediately after the start, determination is done for each microblock. Association between blocks can be defined when, for example, the distance between them is short, and the block widths (heights in the horizontal direction) are almost the same. The pieces of information about the distance, width, and height are extracted by referring to the DAOF.

FIG. 18A shows an actual page configuration, and FIG. 18B shows the document structure tree. With the grouping in step S802a, T3, T4, and T5 form a group V1, and T6 and T7 form a group V2. These groups belong to the same layer.

The presence/absence of a vertical separator is checked (step S802b). A separator physically indicates, for example, an object having a line attribute in the DAOF and logically indicates an element which explicitly divides blocks in an application. When a separator is detected, the groups are re-divided in the same layer.

It is determined on the basis of the group length whether the groups cannot be divided anymore (step S802c). For example, it is determined whether the vertical group length equals the page height. If the vertical group length equals the page height (YES in step S802c), document structure tree generation finishes. In, for example, the structure shown in FIG. 18A, no separator is present, and the group height does not match the page height (NO in step S802c). Hence, the process advances to step S802d.

In step S802d, the blocks are regrouped on the basis of association in the horizontal direction. Even in this regrouping, the first determination immediately after the start is done for each microblock. Definitions of association between blocks and the determination information are the same as in the vertical direction. In, for example, the structure shown in FIG. 18A, T1 and T2 form a group H1, and V1 and V2 form a group H2. H1 is a group one level higher than T1 and T2. H2 is a group one level higher than V1 and V2. H1 and H2 belong to the same layer.

The presence/absence of a horizontal separator is checked (step S802e). In FIG. 18A, a separator S1 is present. This is registered in the tree, thereby generating the layers H1, S1, and H2. It is determined on the basis of the group length whether the groups cannot be divided anymore (step S802f). For example, it is determined whether the horizontal group length equals the page width.

If the horizontal group length equals the page width (YES in step S802f), document structure tree generation finishes. If the group width does not match the page width (NO in step S802f), the process returns to step S802b to repeat the vertical association check in a layer one level higher. In, for example, the structure shown in FIG. 18A, since the division width equals the page width, the process is ended here. Finally, an uppermost layer V0 representing the entire page is added to the document structure tree.

After the document structure tree is completed, application data is generated in step S804 on the basis of the information of the tree. A detailed example for the structure shown in FIG. 18B will be described.

H1 includes the two blocks T1 and T2 in the horizontal direction. They are defined as two columns. The internal information (text or image as a character recognition result obtained by referring to the DAOF) of T1 is output. Next, the internal information of T2 is output as the other column. Then, S1 is output. H2 includes the two blocks V1 and V2 in the horizontal direction. They are output as two columns. The internal information of V1 is output in the order of T3, T4, and T5. The internal information of V2 is output in the order of T6 and T7 as the other column. The application data conversion process can be done in this way.

Finally, a vectorization flag indicating that the application data is generated by the vectorization process in FIGS. 3 and 4 is added to a predetermined bit of the header of the application data (step S806).

[Addition of Pointer Information]

The pointer information addition process in step S1215 will be described next in detail. When a document to be processed is specified by the search process, or the original file is reproduced by vectorization, and the document should be printed, pointer information is added at the time of printing on paper. This enables easily acquiring the original file data when the document is to be subjected to various processes again.

Figure 19:
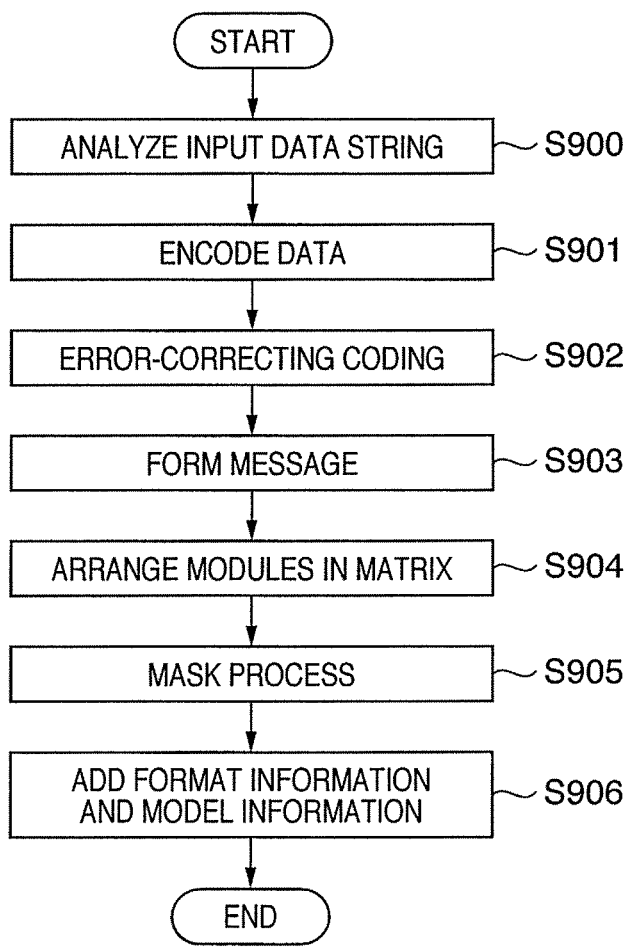
FIG. 19 is a flowchart for explaining a procedure of encoding a data character string serving as pointer information by using a two-dimensional barcode and adding it to an image.

FIG. 19 is a flowchart for explaining a procedure of encoding a data character string serving as pointer information by using the two-dimensional barcode (QR code symbol: JIS X0510) 311 and adding it to an image.

Data embedded in the two-dimensional barcode is address information indicating a server that stores a corresponding file. The server address information is, for example, path information including a file server name, the URL of the corresponding server, or an ID to manage the database 105a or 105b storing the corresponding file or the storage unit 111 provided in the MFP 100 itself.

To identify different kinds of characters to be encoded, the input data string is analyzed. An error detection/error correction level is selected, and a minimum model capable of storing the input data is selected (step S900). The input data string is converted into a predetermined bit string. An indicator representing the mode of data (e.g., numeric character, alphabetic character, 8-bit byte, and kanji character) and a terminal pattern are added as needed. The data is encoded by converting it to predetermined bit codewords (step S901).

To correct errors, the codeword sequence is divided into a predetermined number of blocks based on the model and error correction level. An error correction codeword is generated for every block and added to the end of the data codeword sequence (step S902). The data codewords of the respective blocks obtained in step S902 are connected. The error correction codewords and, as needed, remainder codewords of the respective blocks are connected to form a message (step S903).

The codeword module is arranged in a matrix together with the position detection patterns, separation patterns, timing patterns, and alignment patterns (step S904). An optimum mask pattern for the symbol encoding region is selected. The mask process pattern is converted into the module obtained in step S904 by an XOR operation (step S905). Format information and model information corresponding to the module obtained in step S905 are generated, thereby completing a two-dimensional code symbol (step S906).

For example, the forming unit 112 receives an electronic file from the client PC 102 as print data and prints it on paper as an image. In this case, the data processing unit 115 converts the above-described two-dimensional barcode contained in the server address information into printable raster data and adds it to a predetermined portion on the raster data. The user who has received the paper sheet with the formed image causes the image reading unit 110 to read the two-dimensional barcode so that the location of the server that stores the original electronic file can appropriately be detected from the pointer information in step S1203.

The means for giving additional information for the same purpose is not limited to the two-dimensional barcode described in the first embodiment. For example, a method generally called a digital watermark may be applied by directly adding a character string serving as pointer information to a document, embedding information by modulating a character string and, more particularly, the character interval in a document, or embedding information in a halftone image in a document.

In the above-described way, the MFP 100 can convert image data obtained by reading a document into electronic data by vectorization so that the management PC 101 can edit it, or the storage unit 111 of the MFP 100 can store it. The MFP 100 can also store the electronic data in the document management server 106 or transfer it to the client PC 102.

[Electronic Data Printing Process]

Figure 20:
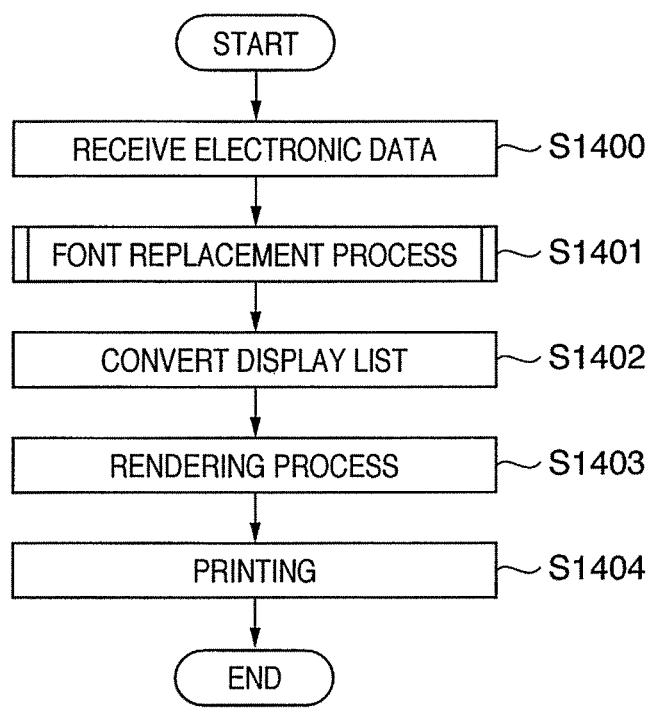
FIG. 20 is a flowchart for explaining details of an electronic data printing process by the image processing system according to the first embodiment of the present invention.

Image processing of causing the MFP 100 to print the generated electronic data will be described next with reference to FIG. 20. FIG. 20 is a flowchart for explaining details of an electronic data printing process by the image processing system according to the first embodiment of the present invention. This process is executed as, for example, one of the processes in step S1216 in FIG. 3.

First, the MFP 100 receives a print target image (electronic data) (step S1400). The MFP 100 executes a font replacement process (step S1401).

The font replacement process is a characteristic feature of the present invention. In this case, the MFP calculates the print size of a character portion which is converted into an outline vector by the vectorization process in FIGS. 3 and 4 in the electronic data. If the character portion is scaled to a predetermined size or less, the font replacement process is executed to replace the outline vector of the character portion with an outline font which contains hint information to generate an outline vector without causing stroke connection in characters smaller than the predetermined size.

Figure 21:
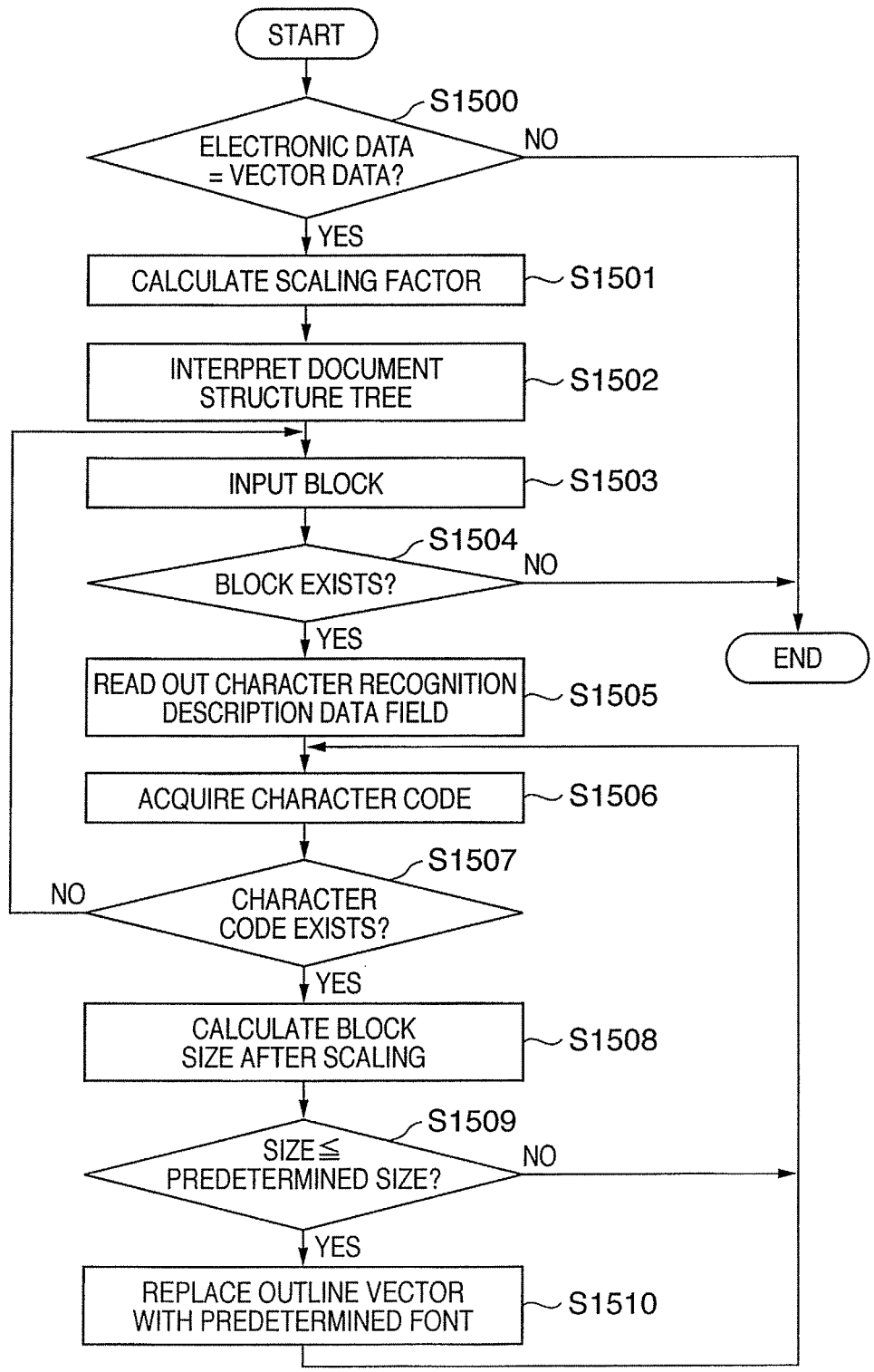
FIG. 21 is a flowchart for explaining details of a process of replacing the outline vector of a character portion with a predetermined outline font by the image processing system according to the first embodiment of the present invention.

The font replacement process will be explained in more detail with reference to FIG. 21. FIG. 21 is a flowchart for explaining details of the process of replacing the outline vector of a character portion with a predetermined outline font by the image processing system according to the first embodiment of the present invention.

First, it is determined on the basis of a vectorization flag added to a predetermined bit of the header of electronic data whether the electronic data received in step S1401 is electronic data (vector data) generated by the vectorization process in FIGS. 3 and 4 (step S1500). If no vectorization flag is added (NO in step S1500), it is determined that the character portion is not converted into an outline vector, and the font replacement process is ended.

If a vectorization flag is added in step S1500 (YES in step S1500), the scaling factor is calculated from a print job parameter designated by the user (step S1501).

Next, the document structure tree of the received electronic data which has a structure as shown in FIG. 18B is interpreted (step S1502). A first block serving as a leaf (distal end) of the document structure tree is selected and input (step S1503) The blocks are selected in the order of depth-first search starting from the origin defined at the upper left corner of the page image to the right and lower sides on the basis of the address information of each block. In the document structure tree shown in FIG. 18B, the blocks are scanned in the order of T1→T2→T3→ . . . →T7.

The presence/absence of a process target block is determined (step S1504). If no process target block (serving as a leaf of the document structure tree) exists (NO in step S1504), the font replacement process is ended. If a process target block (serving as a leaf of the document structure tree) exists (YES in step S1504), data is read out from the character recognition description data field 793 of the DAOF of the block (step S1505).

A character code is acquired from the readout data (step S1506). The presence/absence of an acquirable character code is determined (step S1507). If no character code exists (NO in step S1507), the process returns to step S1503 to input the next block. If a character code exists (YES in step S1507), the first character code is acquired.

Each character data acquired from the data in the character recognition description data field 793 contains information about the coordinates, width, and height of the block region containing the character. This information is generated on the basis of the block information table shown in FIG. 6. On the basis of the width and height information of the character block and the scaling factor calculated in step S1501, the print size of the character block after scaling is calculated (step S1508).

It is determined whether the character block size calculated in step S1508 is equal to or smaller than a predetermined size (threshold value) (step S1509). If the calculated character block size is larger than the predetermined size (NO in step S1509), the next character code is acquired (step S1506). If the calculated character block size is equal to or smaller than the predetermined size (YES in step S1509), the outline vector is replaced with a corresponding character code, character size information, and a font selection instruction to select a predetermined outline font set in the MFP 100 in advance (step S1510). Examples of the predetermined outline font are "Century" for the alphabet and T"MS Mincho" for the kana and kanji.

The process in step S1510 will be described below in more detail. Regarding the block including the process target character, the data in the character recognition description data field 793 of the DAOF contains the coordinate information of the block region generated on the basis of the block information table in FIG. 6 in addition to the character code, as described above.

On the other hand, regarding the block including the process target character, the data in the image description data field 795 of the DAOF contains the coordinate information of the block region in addition to the outline vector information (corresponding to each character). The character code in the character recognition description data field 793 is associated with the outline vector information in the image description data field 795 by the coordinate information of the block region including the character. That is, the coordinate information functions as association information between the character code in the character recognition description data field 793 and the outline vector information in the image description data field 795.

In step S1510, the outline vector in the image description data field 795 corresponding to the character code in the character recognition description data field 793 is detected on the basis of the association information. The detected outline vector is replaced with a character code, character size information, and a font selection instruction to select a predetermined outline font set in advance.

The above-described process is executed for all blocks serving as leaves of the document structure tree. The outline vectors of all characters whose sizes after scaling are equal to or smaller than the predetermined size are replaced with corresponding character codes and font selection instructions to select a predetermined outline font. Then, the font replacement process (step S1401) is ended. In the replacement process, each outline vector is converted into a font selection instruction to read out an outline font and a character code. Instead, each outline vector may be converted into the outline font data of a character corresponding to the outline vector.

The electronic data that has undergone the font replacement is converted into DisplayList as intermediate data for rendering (step S1402). A rendering process is executed by inputting this data (step S1403). The rendered data is printed (step S1404).

When the outline vector is converted into a character code, character size information, and a font selection instruction to select a predetermined font in step S1510, outline font data is read out from a storage medium on the basis of the font selection instruction and character code in step S1402. Examples of the storage medium are an HDD and a ROM. The readout outline font data is converted into coordinates on the basis of the character size information. Bitmap image data is generated on the basis of the coordinate-converted outline font data. The generated bitmap image data and the print position information of the generated bitmap image data are added to the DisplayList as one character object.

When the outline vector is converted into character size information and outline font data containing hint information in step S1510, the outline font data of the predetermined outline font with the hint information of the character to be output is converted into coordinates on the basis of the character size information in step S1402. Bitmap image data is generated on the basis of the coordinate-converted outline font data. The generated bitmap image data and the print position information of the generated bitmap image data are added to the DisplayList as one character object.

If the outline vector is not converted into outline font data or a font selection instruction to select a predetermined font in step S1510, the outline vector is converted into coordinates on the basis of the character size information in step S1402. Bitmap image data is generated on the basis of the coordinate-converted outline vector. The generated bitmap image data and the print position information of the generated bitmap image data are added to the DisplayList as one character object.

In the rendering process, the character object is rendered together with the remaining objects to generate raster data.

With the above-described process, for a character whose size after scaling is larger than the predetermined size (threshold value), the image description data field 795 of the DAOF holds the outline data of the character by the font replacement process (step S1401) for rendering/printing. It is possible to print a character whose shape faithfully reproduces the input document image read in generating the electronic data by using the outline data.

On the other hand, for a character whose size after scaling is equal to or smaller than the predetermined size (threshold value), the image description data field 795 of the DAOF holds an outline font or a font selection instruction to select a predetermined outline font held in the MFP 100 by the font replacement process (step S1401). For this reason, it is possible to print a readable character based on the hint information of the outline font.

More specifically, assume that, for example, the document shown in FIG. 8 should be reduced and printed. The size of a character (e.g., "A") included in the text block 313 should be reduced to a size (e.g., 5 point) smaller than 6 point. In this case, the outline vector "A" held in the image description data field of the DAOF is replaced with a set of a character code and a font selection instruction to access the outline font of 5-point "A" in Century typeface and held by the process in step S1510.

In this example, Century is set in the MFP 100 in advance as a typeface to be used to replace the outline vector of an alphabetic character with an outline font.

Hint information serving as font correction information indicates a mechanism for correcting the font shape to improve the visibility by, for example, eliminating stroke connection in characters or uneven line widths in outputting an outline font at a low resolution, as described above. A font vendor sets hint information in an outline font for the correction process.

As described above, according to the first embodiment, it is possible to reduce electronic data generated by converting character information into vector data representing its outline and print the data while maintaining the readability of the character portion.

More specifically, in reducing electronic data to a very small size and printing it, if each character portion has a predetermined size (threshold value) or less, vector data representing the outline is replaced with a predetermined outline font, and then reduced and output. An image that faithfully reproduces the original input document image is obtained for a character portion larger than the predetermined size, whereas an image maintaining the readability is obtained for a character portion having the predetermined size or less.

Second Embodiment

In the first embodiment, the MFP 100 executes the font replacement process (step S1401) in the print process. The font replacement process need not always be done by the MFP 100.

Figure 22:
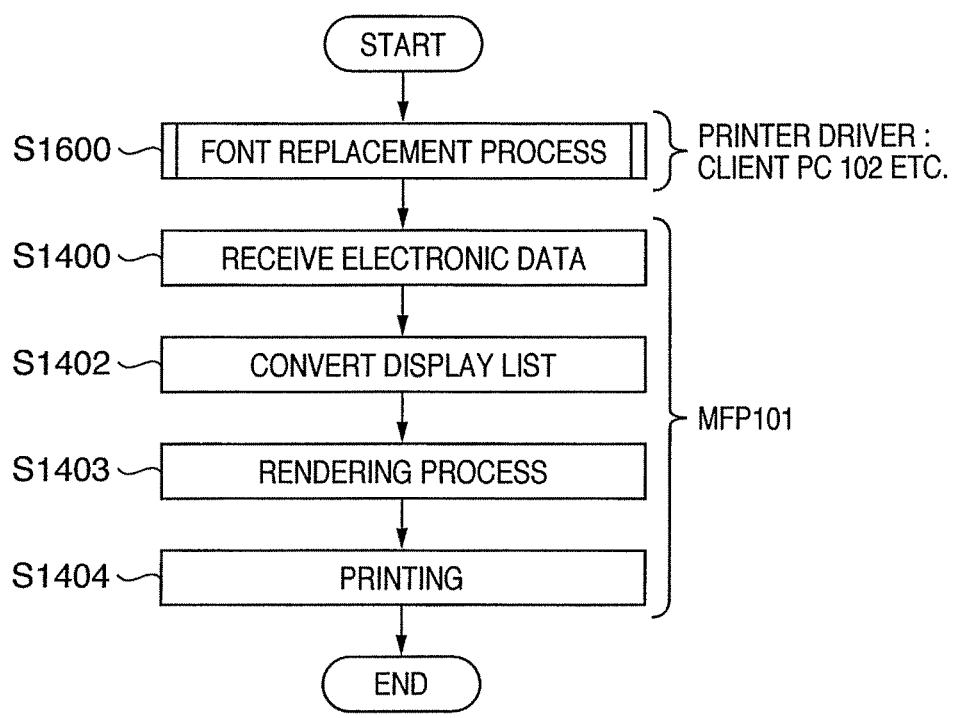
FIG. 22 is a flowchart for explaining details of an electronic data printing process by an image processing system according to the second embodiment of the present invention.

As shown in FIG. 22, for example, when a client PC 102 in FIG. 1 issues a print job, a printer driver on it executes the font replacement process (step S1600). Then, the client PC 102 transfers electronic data to an MFP 100. On the other hand, the MFP 100 can execute electronic data reception (step S1401), DisplayList conversion (step S1402), rendering process (step S1403), and print process (step S1404).

The throughput of the client PC 102 (CPU) is normally higher than that of the MFP 100. Hence, in the arrangement of the second embodiment, the client PC 102 can execute the font replacement process with a relatively heavy process load, and the process load on the MFP 100 can be reduced.

Third Embodiment

In the first embodiment, a predetermined outline font preset in the MFP 100 is used as an outline font for replacement in the font replacement process (step S1600). However, in creating electronic data, a character recognition description data field 793 of the DAOF may hold a character code containing font information and hint information, that is, outline font. The outline font is used in font replacement.

This arrangement allows document printing using a format independently of font replacement setting in an MFP 100. More specifically, if a character portion in electronic data has a predetermined size (threshold value) or less, it can be output by using the outline font in the electronic data. If a character portion is larger than the predetermined size, it can be output by using the outline data in the electronic data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-290264 filed on Oct. 25, 2006, which is hereby incorporated by reference herein in its entirety.

What is claimed is:

1. An image processing apparatus comprising:
an input unit configured to input a document image obtained by reading a document;
a vectorization unit configured to vectorize an outline of a character portion in the document image into an outline vector by using vector data;
a storage unit configured to store outline font data;
a determination unit configured to determine whether a size of a character represented by the outline vector to be output is not more than a predetermined size;
a replacement unit configured to replace the outline vector with a character code indicating the character and size information indicating the size of the character to be output in a case where said determination unit determines that the size of the character to be output is not more than the predetermined size; and a generation unit configured to read out the outline font data from the storage unit based on the character code and generate image data by using the outline font data and the size information in the case where said determination unit determines that the size of the character to be output is not more than the predetermined size, and generate image data by using the outline vector and the size information in a case where said determination unit determines that the size of the character to be output is more than the predetermined size.

2. The apparatus according to claim 1, wherein said replacement unit replaces the outline vector with a font selection instruction for selecting a predetermined outline font, and
wherein said generation unit reads out the predetermined outline font data based on the font selection instruction and the character code and generates image data by using the predetermined outline font data.

3. The apparatus according to claim 1, wherein said replacement unit replaces the outline vector with size information and outline font data containing hint information instead of character code and size information, and
wherein said generation unit generates image data by using the size information and the outline font data containing the hint information in a case where the outline vector is replaced with the size information and the outline font data containing the hint information.

4. The apparatus according to claim 1, wherein the outline font data contains hint information to increase readability of a character smaller than the predetermined size.

5. The apparatus according to claim 1, further comprising:
a character recognition unit configured to perform a character recognition process to the character portion of the document image and obtain a character code indicating a character type corresponding to the character portion,
wherein the outline font data is selected from the storage unit based on the character code.

6. An image processing method, comprising:
an inputting step of inputting a document image obtained by reading a document;
a vectorizing step of vectorizing an outline of a character portion in the document image into an outline vector by using vector data;
a storing step of storing outline font data in a storage unit;
a determining step of determining whether a size of a character represented by the outline vector to be output is not more than a predetermined size;
a replacement step of replacing the outline vector with a character code indicating the character and size information indicating the size of the character to be output in a case where it is determined that the size of the character to be output is not more than the predetermined size; and
a generating step of reading out the outline font data from the storage unit based on the character code and generating image data by using the outline font data and the size information in the case where it is determined in the determining step that the size of the character to be output is not more than the predetermined size, and generating image data by using the outline vector and the size information in a case where it is determined in the determining step that the size of the character to be output is more than the predetermined size.

7. The method according to claim 6,
wherein said replacement step replaces the outline vector with a font selection instruction for selecting a predetermined outline font, and
wherein said generation step reads out the predetermined outline font data based on the font selection instruction and the character code and generates image data by using the predetermined outline font data.

8. The method according to claim 6,
wherein said replacement step replaces the outline vector with size information and outline font data containing hint information instead of character code and size information, and
wherein said generation step generates image data by using the size information and the outline font data containing the hint information in a case where the outline vector is replaced with the size information and the outline font data containing the hint information.

9. The method according to claim 6, wherein the outline font data contains hint information to increase readability of a character smaller than the predetermined size.

10. The method according to claim 6, further comprising:
a character recognition step of performing a character recognition process to the character portion of the document image and obtaining a character code indicating a character type corresponding to the character portion,
wherein the outline font data is selected from the storage unit based on the character code.

11. A computer-readable storage medium retrievably storing a computer-executable program, causing a computer to execute steps comprising:
an inputting step of inputting a document image obtained by reading a document;
a vectorizing step of vectorizing an outline of a character portion in the document image into an outline vector by using vector data;
a storing step of storing outline font data in a storage unit;
a determining step of determining whether a size of a character represented by the outline vector to be output is not more than a predetermined size;
a replacement step of replacing the outline vector with a character code indicating the character and a size information indicating the size of the character to be output in a case where it is determined that the size of the character to be output is not more than the predetermined size; and
a generating step of reading out the outline font data from the storage unit based on the character code and generating image data by using the outline font data and the size information in the case where it is determined in the determining step that the size of the character to be output is not more than the predetermined size, and generating image data by using the outline vector and the size information in a case where it is determined in the determining step that the size of the character to be output is more than the predetermined size.

12. The computer-readable storage medium according to claim 11,
wherein said replacement step replaces the outline vector with a font selection instruction for selecting a predetermined outline font, and
wherein said generation step reads out the predetermined outline font data based on the font selection instruction and the character code and generates image data by using the predetermined outline font data.

13. The computer-readable storage medium according to claim 11,
wherein said replacement step replaces the outline vector with size information and outline font data containing hint information instead of character code and size information, and wherein said generation step generates image data by using the size information and the outline font data containing the hint information in a case where the outline vector is replaced with the size information and the outline font data containing the hint information.

14. The computer-readable storage medium according to claim 9, wherein the outline font data contains hint information to increase readability of a character smaller than the predetermined size.

15. The computer-readable storage medium according to claim 11, wherein the steps further comprise:

a character recognition step of performing a character recognition process to the character portion of the document image and obtaining a character code indicating a character type corresponding to the character portion, wherein the outline font data is selected from the storage unit based on the character code.

16. An image processing apparatus comprising:

a determination unit configured to determine whether a size of a character represented by an outline vector to be output is not more than a predetermined size; and a generation unit configured to generate image data based on the size of the character to be output, outline font data corresponding to the character to be output and hint information contained in the outline font data in a case where said determination unit determines that the size of the character to be output is not more than the predetermined size, and generate image data based on the size of the character to be output and the outline vector in a case where said determination unit determines that the size of the character to be output is more than the predetermined size, the hint information being used for correcting a font shape of the outline font data to improve a visibility.

17. An image processing method, comprising:

a determination step of determining whether a size of a character represented by an outline vector to be output is not more than a predetermined size; and a generation step of generating image data based on the size of the character to be output, outline font data corresponding to the character to be output and hint information contained in the outline font data in a case where it is determined in the determination step that the size of the character to be output is not more than the predetermined size, and generating image data based on the size of the character to be output and the outline vector in a case where it is determined in the determination step that the size of the character to be output is more than the predetermined size, the hint information being used for correcting a font shape of the outline font data to improve a visibility.

18. A computer-readable storage medium retrievably storing a computer-executable program, causing a computer to execute steps comprising:

a determination step of determining whether a size of a character represented by an outline vector to be output is not more than a predetermined size; and a generation step of generating image data based on the size of the character to be output, outline font data corresponding to the character to be output and hint information contained in the outline font data in a case where it is determined in the determination step that the size of the character to be output is not more than the predetermined size, and generating image data based on the size of the character to be output and the outline vector in a case where it is determined in the determination step that the size of the character to be output is more than the predetermined size, the hint information being used for correcting a font shape of the outline font data to improve a visibility.

* * * * *